United States Patent
Shetty et al.

(10) Patent No.: US 12,197,967 B2
(45) Date of Patent: Jan. 14, 2025

(54) LATE CONNECTION BINDING FOR BOTS

(71) Applicant: Workato, Inc., Cupertino, CA (US)

(72) Inventors: Harish Shetty, Sunnyvale, CA (US); Gautham Viswanathan, Saratoga, CA (US); Alexey Pikin, Sunnyvale, CA (US); Konstantin Zhandov, Sunnyvale, CA (US); Bhaskar Roy, Los Altos, CA (US)

(73) Assignee: WORKATO, INC., Palo Alto, CA (US)

( * ) Notice: Subject to any disclaimer, the term of this patent is extended or adjusted under 35 U.S.C. 154(b) by 223 days.

(21) Appl. No.: 16/952,059

(22) Filed: Nov. 18, 2020

(65) Prior Publication Data

US 2021/0073051 A1 Mar. 11, 2021

Related U.S. Application Data

(63) Continuation of application No. 15/973,294, filed on May 7, 2018, now Pat. No. 10,872,000.

(60) Provisional application No. 62/502,451, filed on May 5, 2017.

(51) Int. Cl.
*G06F 9/54* (2006.01)
*H04L 9/40* (2022.01)
*H04W 4/21* (2018.01)

(52) U.S. Cl.
CPC ............ *G06F 9/54* (2013.01); *H04L 63/0853* (2013.01); *H04W 4/21* (2018.02)

(58) Field of Classification Search
None
See application file for complete search history.

(56) References Cited

U.S. PATENT DOCUMENTS

| 9,088,563 | B2* | 7/2015 | Driscoll ............... H04L 63/083 |
| 2002/0055849 | A1* | 5/2002 | Georgakopoulos .... G06Q 10/06 717/102 |
| 2008/0027781 | A1* | 1/2008 | vom Scheidt ...... G06Q 10/0633 705/7.27 |

(Continued)

FOREIGN PATENT DOCUMENTS

WO  WO-2014007813 A1 * 1/2014 ........... G06F 3/0482

*Primary Examiner* — Chat C Do
*Assistant Examiner* — William C Wood
(74) *Attorney, Agent, or Firm* — VLP Law Group, LLP; Michel Bohn

(57) ABSTRACT

Technology for implementing a system for customizing software recipes or applets is described. In some implementations, a method, implemented using a computing device, may include receiving request to execute a software recipe from a first software application operated by a first user and determining whether the software recipe includes a connection placeholder for a recipe connection to a second software application. The method may then determine whether a first connection to the second software application exists for the first user, retrieve first connection details of the first connection to the second software application from a recipe connection data store, and execute the software recipe using the first connection details in place of the connection placeholder for the recipe connection to the second software application. In some implementations, interaction with and execution of the software recipes is performed using bots in a chat environment.

20 Claims, 16 Drawing Sheets

(56) References Cited

U.S. PATENT DOCUMENTS

| | | | |
|---|---|---|---|
| 2009/0059946 A1* | 3/2009 | Iba | G06Q 10/06 370/429 |
| 2013/0205373 A1* | 8/2013 | Jaudon | H04W 4/06 726/4 |
| 2014/0379609 A1* | 12/2014 | Shridhar | G06Q 10/107 705/345 |
| 2015/0123775 A1* | 5/2015 | Kerdemelidis | G06F 3/016 340/407.1 |
| 2016/0132608 A1* | 5/2016 | Rathod | H04W 4/21 707/722 |
| 2017/0147190 A1* | 5/2017 | Twist | G06F 3/0481 |
| 2018/0083825 A1* | 3/2018 | Prabhakara | H04L 41/5019 |
| 2018/0278552 A1* | 9/2018 | Quock | G06Q 20/4016 |
| 2018/0359264 A1* | 12/2018 | Sweet | H04L 63/0853 |
| 2019/0087791 A1* | 3/2019 | Delaney | G06Q 20/02 |

\* cited by examiner

LATE CONNECTION BINDING FOR BOTS

CROSS-REFERENCE TO RELATED APPLICATIONS

This application is a continuation of U.S. patent application Ser. No. 15/973,294, entitled "Late Connection Binding for Bots," filed May 7, 2018, which claims the benefit under 35 U.S.C. § 119(e) of U.S. Provisional Patent Application No. 62/502,451, entitled "Late Connection Binding for Bots," filed May 5, 2017, the entire contents of which are incorporated herein by reference.

BACKGROUND

The present disclosure relates to a platform for generating, executing, and managing application programming interface recipes.

With the onset of the Internet economy, numerous (e.g., hundreds, thousands, etc.) companies have developed online platforms providing various types of different functionalities and services to their end users. These third-party applications range from consumer applications, such as social media, photo sharing, money management, messaging, and entertainment platforms, to business and enterprise software as a service (SaaS) offerings, such as customer relationship management (CRM) platforms, enterprise resource planning (ERP) platforms, workplace collaboration platforms, financial and billing platforms, human resource management platforms, analytics platforms, etc.

A software application can access the computing services offered by these third-party applications using application programing interfaces (APIs) exposed by these platforms. In most cases, the APIs are accessible using standardized access protocols (e.g., SOAP, REST, CORBA, ICE, etc.). These APIs include software methods for accessing the various functionality of the applications, as well as data retrieval methods for accessing information about the APIs, objects, object types, and other aspects of the applications. The APIs generally require users have the requisite permission and authenticate using standard authentication routines (OpenID, OAuth, various proprietary authorization protocols, etc.).

However, integrating (e.g., automating workflow between) these third-party applications (CRM, word processing, storage, versioning, and/or other services) is very complex, time and resource intensive, and ultimately very costly. Moreover, the custom software needed for any such integration is often unreliable due to the constancy of the changes that occur within the third-party applications and/or their APIs. Small to mid-sized business are often unable to bear these integration costs and ultimately lose sales.

Further, in some existing solutions, integration programs may be individually customized for each user, such that there may be hundreds or thousands of instances of an integration program, thereby consuming large amounts of computing resources to generate, store, retrieve, and execute the integration programs.

What is needed is a cost-effective, low-maintenance, active, and powerful third-party application integration platform that addresses the above-noted deficiencies.

SUMMARY

This disclosure describes technology that addresses the above-noted deficiencies of existing solutions.

In one innovative aspect, a system and method for customizing software recipes is disclosed. The method involves receiving request to execute a software recipe from a first software application operated by a first user; determining that the software recipe includes a connection placeholder for a recipe connection to a second software application; determining that a first connection to the second software application exists for the first user; retrieving first connection details of the first connection to the second software application from a recipe connection data store; and executing the software recipe using the first connection details in place of the connection placeholder for the recipe connection to the second software application.

Implementations may include one or more of the following features. The computer-implemented method further including: receiving a request to execute the software recipe from a second user on the first software application; responsive to determining that the software recipe includes the connection placeholder for the recipe connection to the second software application, determining that a second connection to the second software application exists for the second user; retrieving second connection details of the second connection to the second software application from the recipe connection data store; and executing the software recipe using the second connection details in place of the connection placeholder for the recipe connection to the second software application. The computer-implemented method further including: determining that the first connection of the first user to the second software application does not exist in the recipe connection data store; and establishing the first connection details of the first connection of the first user to the second software application. The computer-implemented method where establishing the first connection details of the first connection to the second software application for the first user includes facilitating authentication of the first user by the second software application, receiving, from the second software application, the first connection details of the first connection to the second software application, and storing the first connection details of the first connection to the second software application in the recipe connection data store in association with the first user. The computer-implemented method where the first connection details include an access token associated with the first user, the access token enabling the first connection for the first user between a computing device and the second software application, the first connection being authenticated using the access token. The computer-implemented method further including: determining that the first connection details for the first connection to the second software application for the first user have expired; responsive to determining that the first connection details to the second software application have expired, automatically requesting the second software application to renew the first connection to the second software application; receiving, from the second software application, new first connection details for the first connection to the second software application; and storing the new first connection details for the first connection to the second software application for the first user in a recipe connection data store. The computer-implemented method where executing the software recipe includes generating a recipe result using the first connection of the first user to the second software application, and the method includes providing the recipe result of the software recipe to the first user on the first software application, the first software application being distinct from the second software application. The computer-implemented method where the first software application includes a chat application, the chat application being coupled with a virtual agent; and receiving the request to execute the software recipe from the first user includes receiving, by the virtual agent, a chat message in a communication channel of the chat application, extracting, by the virtual agent, the request to execute the software recipe from the chat message, and identifying the first user in the chat application from the chat message. The computer-implemented method further including: calling, by the virtual agent, the software recipe based on the request to execute the software recipe; receiving, by the virtual agent, a recipe result from the second software application based on the request to execute the software recipe; and providing, by the virtual agent, the recipe result in the communication channel of the chat application. The computer-implemented method further including: generating the software recipe including: receiving user input from a third user identifying a trigger condition and an action response for the software recipe, one or more of the trigger condition and the action response using the recipe connection to the second software application, the first user having an administrative access level for a particular group of users; receiving user input from the third user tagging the recipe connection to the second software application for the software recipe as late bindable; and responsive to the software recipe being tagged as late bindable, storing the connection placeholder in association with the one or more of the trigger condition and the action response of the software recipe in the recipe connection data store. Implementations of the described techniques may include hardware, a method or process, or computer software on a computer-accessible medium.

Other implementations of one or more of these aspects or other aspects include corresponding systems, apparatus, and computer programs, configured to perform the various actions and/or store various data described in association with these aspects. These and other implementations, such as various data structures, are encoded on tangible computer storage devices. Numerous additional features may in some cases be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DESCRIPTION

Figure 1:
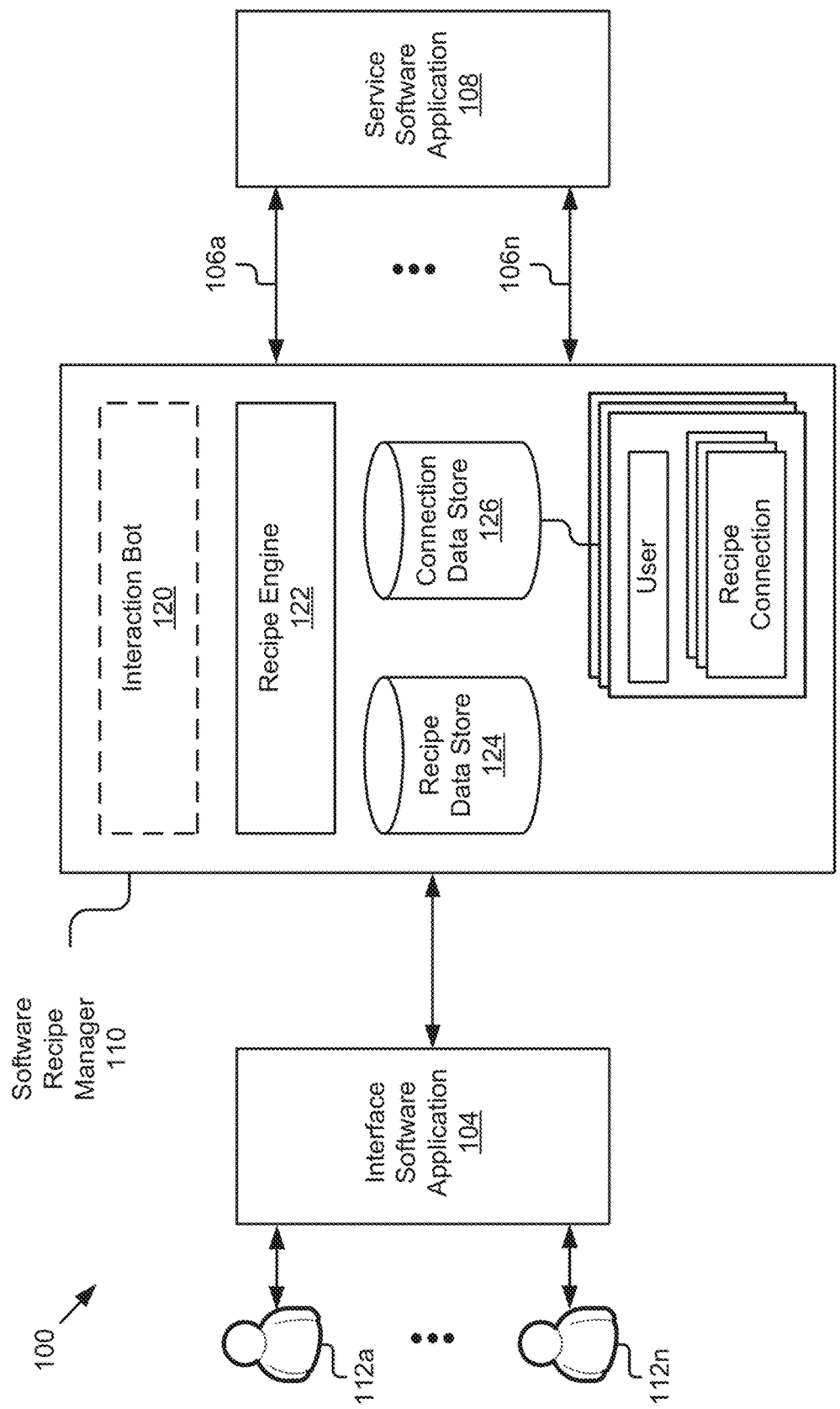
FIG. 1 depicts an example system and communication flow for implementing late connection binding using bots.

The technology described herein allows multiple users to use a software recipe, for example, a software recipe or execution thereof may be customized for each user. In some implementations, the technology may allow a user to use their own account with an external system. According to some implementations, the technology may be used within chat platforms, such as Slack™ or Microsoft Teams™ where bots may be used.

In some implementations, bots and/or software recipes may be personal or designed to function in a group environment. For instance, the technology described herein may be used from a single user's or administrator's perspective within a team, but may be automatically customized to each individual user's perspective. The administrator may build a software recipe and/or a bot for a user or for a team, and may, according to some implementations, tag an attribute or object of the software recipe as customizable, as described below. Permissions, objects, or other attributes of a recipe or bot may be global within a group of users or specific to individual users. For example, objects in a recipe or bot can be tagged by an administrator to prevent the system from executing certain commands from certain users or may be tagged to execute certain commands in certain user's context (e.g., to customize the experience or actions for that user).

A recipe may include an integration flow that contains a trigger and a set of actions. The trigger may cause the actions in a recipe to be executed. Actions may include the routines the software recipe runs. In some implementations, each action may include an input configuration and may be associated with a given application. Each trigger and action may further include an input schema and an output schema. Actions may run in parallel, series, or various combinations thereof. In some instances, one action may be dependent upon the output of a preceding action. In some recipe configurations, the different actions in the software recipe are associated with different applications, and the software recipe automates the interaction between the different applications using the application programming interfaces (APIs) of those applications. For instance, the software recipe may flow, sync, etc., data from one application to another, populate multiple different applications with data from a certain source application, etc. In some implementations, the software recipes are written in Ruby, and the secure containers of the worker instances interpret and process the codes, although it should be understood that other languages and interpreters may be used.

According to some implementations, the technology described herein may provide for an intermediate software layer to facilitate interaction between a particular user and an application using a bot (e.g., the interaction bot 120), wherein the intermediate layer is coupled to a configurable customizations database to allow a single bot to be used among a group of users while personalizing the experience and/or bot actions for each user. For example, a single bot or recipe could be installed once for a group/team of users by an administrator, but the bot or recipe could be run for the specific user thereby customizing the use and/or results of the software recipe to that user (or, in some instances, group of users). In some instances, the administrator may define the behavior of the software recipe for the whole group. The techniques described herein may enable individualized user specific customization and/or interaction (defined by the administrator or individual users) within the group of users for the single bot. For instance, certain commands/requests may be identified as using a personalized connection (e.g., to an external system and/or bot).

In some implementations, the technology may run in a group environment, such as an online chat channel. The technology may authenticate individuals to allow the individuals to perform specific actions in an external system, for example, through a bot and/or software recipe. For example, in a group environment, such as within a chat tool, the technology described herein may allow a particular action (e.g., by or using a service or external system connected to the software recipe) to be performed by a user calling a software recipe via a chat bot, the user being authenticated at runtime. In some implementations, the technology may identify a specific user within a group of users and cause a bot and/or recipe to customize the recipe result for that user, despite, for example, having only a single bot and/or a single instance of a recipe.

In some implementations, the technology may provide an extra level of authorization, so that, a user that is a member of a chat channel (e.g., a group chat or group collaboration environment) may be authenticated for a particular task. In some implementations, the authentication may be performed by a connected service (e.g., the service software application 108). By offloading the task of authentication from the bot or software recipe, implementations of the technology described herein reduce bandwidth and processing resource consumption.

Further, the technology described herein allows an administrator to generate a recipe that authenticates a user with a service software application 108, for example, using late connection binding, as described in detail below. For instance, the technology described herein my allow an administrator to generate a single software recipe with a connection placeholder that indicates that a recipe may connect with an external service, such as the service software application 108 using connection details to be determined at runtime. Accordingly, while there may be many users who may each be authenticated with an external service (e.g., each using separate login credentials), the software recipe may dynamically adapt to each user at runtime. As such, the technology is beneficial as it reduces the processing and memory storage resources consumed using separate software recipes for each of the users' connections.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 depicts an example system 100 and communication flow for implementing late connection binding, for example, using bots. The example system 100 may include a software recipe manager 110, an interface software application 104 accessible by one or more users 112a . . . 112n, and a service software application 108 with one or more connections 106a . . . 106n to one or more software recipe manager(s) 110. A connection 106 may be a digital communication between, for example, the software recipe manager 110 and the service software application 108 via a computer communication protocol. In some implementations, the connections 106 may use connection details, such as authentication credentials or tokens, as described in further detail elsewhere herein.

The software recipe manager 110 may, in some implementations, include one or more hardware and/or virtual servers programmed to perform the operations, acts, and/or functionality described herein. The components of the software recipe manager 110 may comprise software routines storable in one or more non-transitory memory devices and executable by one or more computer processors to carry out the operations, acts, and/or functionality described herein. In further implementations, these routines, or a portion thereof, may be embodied in electrical hardware that is operable to carry out the operations, acts, and/or functionality described herein. In some implementations, the software recipe manager 110 may interact with a user, for example, via the interface software application 104, determine which recipe to execute, determine a connection to a service software application 108, and execute the software recipe using the determined connection. In some implementations, the software recipe manager 110 may also facilitate the creation of recipes.

The service software application 108 may be implemented using software and/or hardware logic executable by a computing system to perform the operations herein. In some implementations, the service software application 108 may be operational on one or more hardware and/or virtual servers programmed to perform the operations, acts, and/or functionality described herein. For instance, the service software application 108 may be operable on a third-party server communicatively coupled with the software recipe manager 110, for example, via a computer network. For example, the server software application may include a service that receives data requests and serves responses, for example from and to the software recipe manager 110 or another computing device. Examples of service software application 108s include Salesforce™, Google™ calendars, databases, etc.

In some implementations, the service software application 108 may use user credentials to provide authenticated communication with computing devices. For example, users may have accounts, along with usernames and passwords, to log into the service software application 108. The service software application 108 may generate secure tokens, for example, using OAuth (e.g., OAuth 1.0, OAuth 2, etc.) and provide the tokens (e.g., to the software recipe manager 110) for future authentication and/or identification of the computing device of the user, although other implementations are possible and contemplated herein.

The interface software application 104 may include an application configured to receive inputs from a user and provide outputs to the user. For example, the interface software application 104 may include a chat application, such as Slack™, Microsoft Teams™, Google Hangouts™, Skype®, etc. It should be noted that implementations of the technology described herein may additionally or alternatively include a short messaging service (SMS), multimedia messaging service (MMS), e-mail, a web form, HTTPS communication, or another communication application or service, for example.

In some implementations, the interface software application 104 may be implemented using software and/or hardware logic executable by a computing system to perform the operations herein. In some implementations, the interface software application 104 may be operational on one or more hardware and/or virtual servers programmed to perform the operations, acts, and/or functionality described herein. For instance, the interface software application 104 may be operable on a third-party server communicatively coupled with the software recipe manager 110, for example, via a computer network or, in some implementations, may be operable on the same server with the software recipe manager 110.

In some implementations, the software recipe manager 110 may include an interaction bot 120, a recipe engine 122, a recipe data store 124, and/or a connection data store 126.

It should be understood that the components of the software recipe manager 110 may be further subdivided or combined. Further, it should be noted that the functionality and components of the software recipe manager 110 may be operable a single device or distributed among multiple devices.

In some implementations, the interaction bot 120 may be implemented using software and/or hardware logic executable by a computing system to perform the operations herein, such as receiving commands from a user (e.g., via the interface software application 104 or another input) thereby providing trigger events, conditions, and/or other information for executing software recipes to the recipe engine 122. In some implementations, the interaction bot 120 may include a virtual agent that interacts with users using verbal or textual communication, for example, it may receive messages in a group chat environment. For example, the interaction bot 120 may scan the messages in a group chat environment for keywords or addresses that signal the interaction bot 120 from the chat. For instance, a message including @interactionbot may indicate to the interaction bot 120 that the contents of the message or subsequent messages are directed to the interaction bot 120. The interaction bot 120 may then perform an operation (e.g., calling/running a recipe based on the contents of the message or other input).

In some implementations, the interaction bot 120 may be programmed to intercept messages directed to a service software application 108 and cause recipes associated with the service software application 108 to be executed. For example, an interaction bot 120 may recognize the message "@salesforce run my performance report" and may accordingly run a recipe with the trigger event: "run my performance report" (or "@salesforce run my performance report") and the action/response to communicate with a server associated with Salesforce® to run a report for the particular user (or group of users) dictated by the software recipe, as described in further detail below.

The interaction bot 120 may include a virtual agent, chat bot, or workbot. The interaction bot 120 may refer to an intelligent bot for use with a system or application, for example a bot for use in Slack® chat for interacting with Salesforce®. In some implementations, the interaction bot 120 and/or a software recipe may be associated with an administrator's account and would return values for a connection specific to the administrator (e.g., the administrator's Salesforce® statistics). In some implementations, for example, as described below, the interaction bot 120 and/or software recipe may have a late bindable connection, so that the interaction bot 120 and/or software recipe may be executed using particular connection details for a specific user (e.g., one of many users instead of simply an administrator or a creator of the software recipe).

In some instances, interaction bots 120 or chatbots may enable chat users to communicate with applications, for example, a chatbot may refer to a bot configured to provide a conversational/chat interface to a user, for example, with one or more applications. For example, a user can interact with a service software application 108 from a chat interface. For instance, when a user types the appropriate instructions into a chat platform, the chat platform (e.g., using an interaction bot 120) may collect this information and pass it on the appropriate application to execute the instructions. In some instances, the bot may maintain an authorized connection to a service software application to carry out these instructions. Bots may use single 'admin' type credentials to carry out these instructions on behalf of all chat users, may use team type credentials for groups of chat users, or may use individual credentials for each user.

In some implementations, the recipe engine 122 may be implemented using software and/or hardware logic executable by a computing system to perform the operations herein, such as creating and/or executing recipes. For instance, the recipe engine 122 may allow a user to generate a recipe (e.g., which may be used with or as an interaction bot 120) and/or may execute a recipe in response to a trigger event/condition. In some implementations, the recipe engine 122 may receive events and, in response, execute actions dictated by recipes. In some implementations, where the software recipes include connection placeholders, the recipe engine 122 may determine connection details to establish a connection as part of execution of the software recipe, for instance, at runtime.

In some implementations, the recipe engine 122 may interact with the recipe data store 124 to store recipes, triggers, actions, etc. The recipe data store 124 is an information source for storing and providing access to data. The data stored by the recipe data store 124 may be organized and queried using various criteria including any type of data stored by it, such as a user identifier, tags, locations, user devices, electronic address, trigger events/conditions, actions/responses, etc. The recipe data store 124 may include data tables, relational/semi-structured/graph/etc., databases, or other organized or unorganized collections of data. The interaction bot 120 and/or recipe engine 122 may be coupled to retrieve, generate, and/or store any applicable data in the recipe data store 124 in order to carry out their respective acts and functionalities.

In some implementations, the recipe engine 122 may interact with the connection data store 126 to retrieve connection data (e.g., connection data, tokens, credentials, computing device/service addresses, etc.) and store connection data therein. The connection data store 126 is an information source for storing and providing access to data. The data stored by the connection data store 126 may be organized and queried using various criteria including any type of data stored by it, such as a user identifier, tags, locations, user devices, electronic address, connection details, login credentials, security or access tokens, etc. The connection data store 126 may include data tables, relational/semi-structured/graph/etc., databases, or other organized or unorganized collections of data. The interaction bot 120 and/or recipe engine 122 may be coupled to retrieve, generate, and/or store any applicable data in the connection data store 126 in order to carry out their respective acts and functionalities.

In some implementations, the connection data store 126 may include a logical name space for the accounts. The connections and accounts may be owned by an administrative user or by individual users. When a new connection is generated or otherwise determined, a command (e.g., as an action of a recipe) may be executed with the specified connection. The connection data store 126 may provide a secure storage space for credentials or tokens, for example. For instance, tokens, credentials, or other connection details may be stored in an encrypted space and, when an action is performed where the connection details are needed (e.g., where a connection placeholder is present in a recipe), the connection details may be retrieved and used to complete the action, for example, on behalf of the user.

In some implementations, the connection data store 126 may store tokens or information used in authentication although other implementations are possible and contemplated herein. For instance, the connection data store 126 may store login credentials themselves. Further, it should be noted that, as described in further detail below, the connection details (e.g., tokens) may have expiry dates after which they may be re-authenticated in order to continue to establish connections with service software applications 108. In some implementations, the software recipe manager 110 may receive tokens from service software application 108s in response to login credentials of users being authenticated by the service software application 108 and/or, in some implementations, the software recipe manager 110 may collect usernames and passwords from users.

In some implementations, an interaction bot 120 and/or recipe engine 122 may initially use an administrator account credential upon receiving a command/request or may automatically detect that the user who is creating a ticket to perform the command is not the administrator, for example. The interaction bot 120 and/or recipe engine 122 may check if the user's personalized connection is already stored in a database, such as the connection data store 126. If no personalized connection is stored in the database, the interaction bot 120 and/or recipe engine 122 may request that the user create a personalized connection for the particular system, for example, the interaction bot 120 and/or recipe engine 122 may facilitate the user to create an account with the service software application 108. The recipe engine 122, for instance, may then continue execution using the user specific personalized account.

Figure 2A:
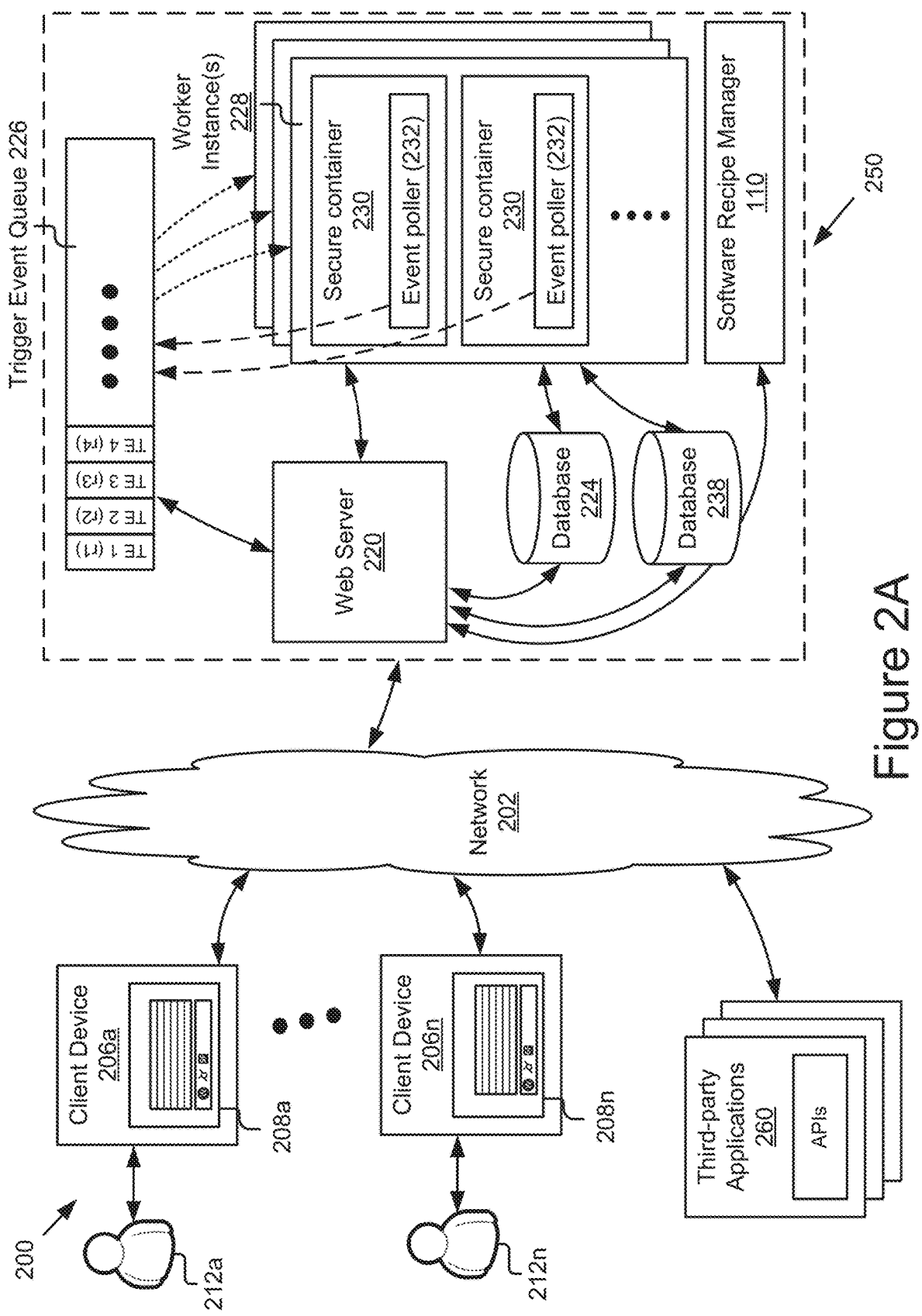
FIG. 2A is a block diagram illustrating an example integration management system.

Although not shown in FIG. 1, in some implementations, the components of the system 100 may communicate via a computer network, such as the network 202, as described in reference to FIG. 2A.

FIG. 2A is a block diagram illustrating an example integration management system 200 encompassed by the technology. The illustrated example system 200 includes client devices 206a . . . 206n, a server system 250, and third-party applications 260, which are communicatively coupled via a network 202 for interaction with one another. For example, the client devices 206a . . . 206n may be respectively coupled to the network 202 and may be accessible by users 212a . . . 212n (also referred to individually and collectively as 212, which may correspond to the users 112 described above). The server system 250 and third-party applications 260 are also communicatively coupled to the network 202. The use of the nomenclature "a" and "n" in the reference numbers indicates that any number of those elements having that nomenclature may be included in the system 200, for example.

The network 202 may include any number of networks and/or network types. For example, the network 202 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc. Data transmitted by the network 202 may include packetized data (e.g., Internet Protocol (IP) data packets) that is routed to designated computing devices coupled to the network 202. In some implementations, the network 202 may include a combination of wired and wireless networking software and/or hardware that interconnects the computing devices of the system 200. For example, the network 202 may include packet-switching devices that route the data packets to the various computing devices based on information included in a header of the data packets.

The client devices 206a . . . 206n (also referred to individually and collectively as 206) include computing systems having data processing and communication capabilities. In some implementations, a client device 206 may include a processor (e.g., virtual, physical, etc.), a memory, a power source, a network interface, and/or other software and/or hardware components, such as a display, graphics processor, wireless transceivers, keyboard, camera, sensors, firmware, operating systems, drivers, and/or various physical connection interfaces (e.g., USB, HDMI, etc.), etc. The client devices 206a . . . 206n may couple to and communicate with one another and the other entities of the system 200 via the network 202 using a wireless and/or wired connection.

Examples of client devices 206 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 206 are depicted in FIG. 2A, the system 200 may include any number of client devices 206. In addition, the client devices 206a . . . 206n may be the same or different types of computing systems.

In the depicted implementation, the client devices 206a . . . 206n respectively contain instances 208a . . . 208n of a client application (also referred to individually and collectively as 208). The client application 208 may be storable in a memory and executable by a processor of a client device 206 to provide for user interaction, receive user input, present information to the user via a display, and send data to and receive data from the other entities of the system 200 via the network 202.

In some implementations, the client application 208 may generate and present various user interfaces to perform these acts and/or functionality, such as the example graphical user interfaces discussed elsewhere herein, which may in some cases be based at least in part on information received from local storage, the server system 250, and/or one or more of the third-party applications 260 via the network 202. In some implementations, the client application 208 is code operable in a web browser, a native application (e.g., mobile app), a combination of both, etc. Additional structure, acts, and/or functionality of the client devices 206 and the client application 208 are described in further detail elsewhere in this document.

In some implementations, the client application 208 may include or provide access to the interface software application 104. In some implementations, the client application 208 may include a desktop chat application (e.g., Slack®, Google Hangouts®, etc., as described above) and may serve as, or communicate with, the interface software application 104. In some implementations, the client application 208 may include a web browser via which the user may interact with an interface software application 104 (e.g., Slack®, Google Hangouts®, etc., as described above).

The server system 250 and/or the third-party applications 260 may include one or more computing systems having data processing, storing, and communication capabilities. For example, these entities 250 and/or 260 may include one or more hardware servers, virtual servers, server arrays, storage devices and/or systems, etc., and/or may be centralized or distributed/cloud-based. In some implementations, these entities 250 and/or 260 may include one or more virtual servers, which operate in a host server environment and access the physical hardware of the host server including, for example, a processor, memory, storage, network interfaces, etc., via an abstraction layer (e.g., a virtual machine manager).

In the depicted implementation, the server system 250 includes a web server 220, a trigger event queue 226, databases 234 and 238, worker instances 228, and a software recipe manager 110. These components, and their sub-components, are coupled for electronic communication with one another, and/or the other elements of the system 200. In some instances, these components may communicate via direct electronic connections or via a public and and/or private computer network, such as the network 202.

In some embodiments, a worker instance 228 represents a worker compute node and may include more than one secure container 230, as shown in FIG. 2A. Each container in the worker instance 228, at a given time, runs a recipe. A container may add trigger events to the trigger event queue 226 and (responsive to the trigger event being triggered) receive events from the trigger event queue 226. The event poller 232 is software configured to poll for messages indicating the completion of a prior call so the secure container can proceed to the next step of the software recipe (or to completion as the case may be). The server system 250 may utilize any suitable runtime environment and process queue/worker architecture, such as Heroku™.

The web server 220 includes computer logic executable by the processor 262 (see FIG. 2B) to process content requests. The web server 220 may include an HTTP server, a REST (representational state transfer) service, or other suitable server type. The web server 220 may receive content requests (e.g., product search requests, HTTP requests) from client devices 206, cooperate with the other components of the server system 250 (e.g., software recipe manager 110, worker instances 228, trigger event queue 226, etc.) to determine the content and or trigger processing, retrieve and incorporate data from the databases 234 and 238, format the content, and provide the content to the client devices 206. In some instances, the web server 220 may format the content using a web language and provide the content to a corresponding client application 208 for processing and/or rendering to the user for display. The web server 220 may be coupled to the databases 234 and 238 to store retrieve, and/or manipulate data stored therein.

In some embodiments, the components 208, 220, 228, 226, and/or 110 may include computer logic storable in the memory 266 and executable by the processor 262, and/or implemented in hardware (e.g., ASIC, FPGA, ASSP, SoC, etc.), to provide their acts and/or functionality. For example, with reference also to FIG. 2B, in some embodiments, the client application 208, the web server 220, the worker instances 228, the trigger event queue 226, and/or the software recipe manager 110, and/or their sub-modules are sets of instructions executable by the processor 262 to provide their functionality. In some embodiments, these components and/or their sub-components are stored in the memory 264 of the computing system 260 and are accessible and executable by the processor 262 to provide their functionality. In any of the foregoing embodiments, these components and/or their sub-components may be adapted for cooperation and communication with the processor 262 and other components of the computing system 260.

The databases 234 and 238 are information sources for storing and providing access to data. Examples of the types of data stored by the databases 234 and 238 may include the recipe data store 124, the connection data store 126, user and partner account information, codes representing the software recipes, requirement tables associated with the codes, input and output schemas associated with the codes and/or applications, objects associated with the applications, codes, and/or schemas, etc., and/or any of the other data discussed herein that is received, processed, stored, or provided by the system 200.

The databases 234 and 238 may be included in the computing system 260 or in another computing system and/or storage system distinct from but coupled to or accessible by the computing system 260. The databases 234 and 238 can include one or more non-transitory computer-readable mediums for storing the data. In some implementations, the databases 234 and 238 may be incorporated with the memory 264 or may be distinct therefrom. In some implementations, the databases 234 and 238 may include a database management system (DBMS) operable on the computing system 260. For example, the DBMS could include a structured query language (SQL) DBMS, a NoSQL DBMS, various combinations thereof, etc. In some instances, the DBMS may store data in multi-dimensional tables comprised of rows and columns, and manipulate, i.e., insert, query, update and/or delete, rows of data using programmatic operations.

The third-party applications 260a . . . 260n, as depicted, respectively expose APIs 362 for accessing the functionality and data of the third-party applications 260a . . . 260n (also referred to individually and collectively as 260). In some implementations, a third-party application 260 may correspond to the service software application 108 or interface software application 104. An application 260 may include hardware (e.g., a server) configured to execute software, logic, and/or routines to provide various services (consumer, business, etc.), such as video, music and multimedia hosting, distribution, and sharing; email; social networking; blogging; micro-blogging; photo management; cloud-based data storage and sharing; ERM; CRM; financial services; surveys; marketing; analytics; a combination of one or more of the foregoing services; or any other service where users store, retrieve, collaborate, generate, consume, and/or share information.

In some implementations, the client application 208, the various components of the server system 250, the third-party applications 260, etc., may require users 212 to be registered to access the acts and/or functionality provided by them, as described in further detail elsewhere herein. For example, to access various acts and/or functionality provided by these components, the components may require a user 212 to authenticate his/her identity (e.g., by confirming a valid electronic address or other information). In some instances, these entities 208, 220, 240, 260, etc., may interact with a federated identity server (not shown) to register/authenticate users 212. Once registered, these entities may require a user 212 seeking access to authenticate by inputting credentials in an associated user interface.

The system 200 illustrated in FIG. 2A is provided as an example, and it should be understood that a variety of different system environments and configurations are contemplated and are within the scope of the present disclosure. For instance, various functionality may be moved from a server to a client, or vice versa and some implementations may include additional or fewer computing systems, services, and/or networks, and may implement various functionality client or server-side. Further, various entities of the system 200 may be integrated into to a single computing device or system or additional computing devices or systems, etc.

Figure 2B:
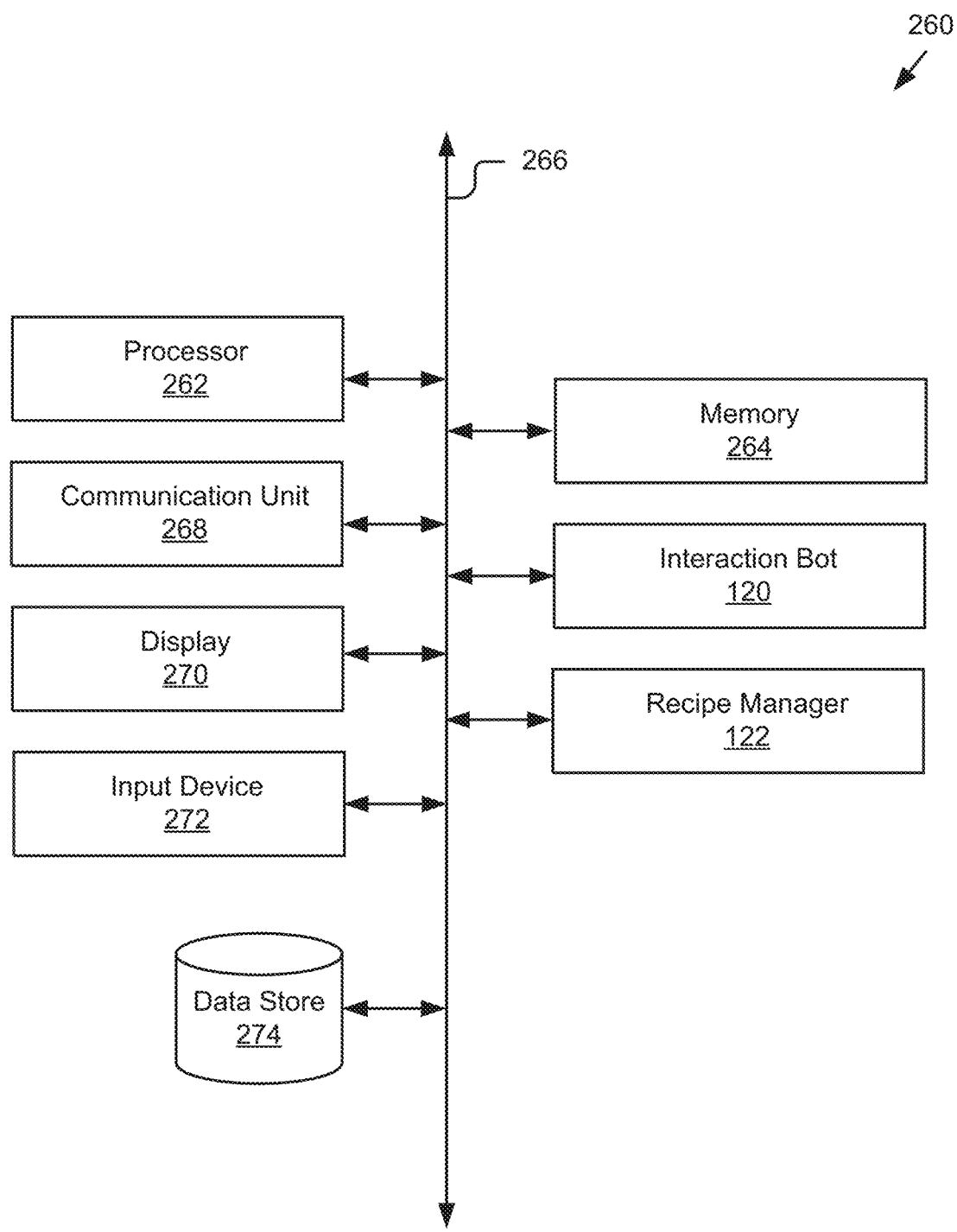
FIG. 2B is a block diagram of an example computing system.

FIG. 2B is a block diagram of an example computing system 260 for implementing the technology described herein, for example, software recipe manager 110. The example computing system 260 may represent the computer architecture of a client device 206, a server system 250, and/or a server of the third-party application 260, depending on the implementation. As depicted, in some implementations, the computing system 260 may include a processor 262, a memory 264, a communication unit 268, a display 270, an input device 272, and/or a data store 274, which may be communicatively coupled by a communications bus 266. The computing system 260 depicted in FIG. 2B is provided by way of example and it should be understood that it may take other forms and include additional or fewer components without departing from the scope of the present disclosure. For instance, various components of the computing devices and may be coupled for communication using a variety of communication protocols and/or technologies including, for instance, communication buses, software communication mechanisms, computer networks, etc.

The processor 262 may execute software instructions by performing various input/output, logical, and/or mathematical operations. The processor 262 may have various computing architectures to process data signals including, for example, a complex instruction set computer (CISC) architecture, a reduced instruction set computer (RISC) architecture, and/or an architecture implementing a combination of instruction sets. The processor 262 may be physical and/or virtual, and may include a single core or plurality of processing units and/or cores. In some implementations, the processor 262 may be capable of generating and providing electronic display signals to a display device, supporting the display of images, capturing and transmitting images, performing complex tasks including various types of feature extraction and sampling, etc. In some implementations, the processor 262 may be coupled to the memory 264 via the bus 266 to access data and instructions therefrom and store data therein. The bus 266 may couple the processor 262 to the other components of the computing system 260 including, for example, the memory 264, the communication unit 268, display 270, the input device 272, and the data store 274.

The memory 264 may store and provide access to data to the other components of the computing system 260. The memory 264 may be included in a single computing device or a plurality of computing devices as discussed elsewhere herein. In some implementations, the memory 264 may store instructions and/or data that may be executed by the processor 262. For example, the memory 264 may include various different combinations of the software components described herein, depending on the configuration. The memory 264 is also capable of storing other instructions and data, including, for example, an operating system, hardware drivers, other software applications, databases, etc. The memory 264 may be coupled to the bus 266 for communication with the processor 262 and the various other components of computing system 260.

The memory 264 includes a non-transitory computer-usable (e.g., readable, writeable, etc.) medium, which can be any tangible apparatus or device that can contain, store, communicate, propagate or transport instructions, data, computer programs, software, code, routines, etc., for processing by or in connection with the processor 262. In some implementations, the memory 264 may include one or more of volatile memory and non-volatile memory. For example, the memory 264 may include, but is not limited, to one or more of a dynamic random access memory (DRAM) device, a static random access memory (SRAM) device, a discrete memory device (e.g., a PROM, FPROM, ROM), a hard disk drive, an optical disk drive. It should be understood that the memory 264 may be a single device or may include multiple types of devices and configurations.

The bus 266 can include a communication bus for transferring data between components of a computing system or between computing systems, a network bus system including the network 202 and/or portions thereof, a processor mesh, a combination thereof, etc. In some implementations, the various components of the system 200 may cooperate and communicate via a software communication mechanism implemented in association with the bus 266. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 268 may include one or more interface devices (I/F) for wired and/or wireless connectivity with the network 202 and/or other computing systems. For instance, the communication unit 268 may include, but is not limited to, CAT-type interfaces; wireless transceivers for sending and receiving signals using Wi-Fi™, Bluetooth®, IrDA™, Z-Wave™, ZigBee®, cellular communications, and the like, etc.; USB interfaces; various combinations thereof; etc. The communication unit 268 may connect to and send/receive data via a mobile network, a public IP network of the network 202, a private IP network of the network 202, etc. In some implementations, the communication unit 268 can link the processor 262 to the network 202, which may in turn be coupled to other processing systems. The communication unit 268 can provide other connections to the network 202 and to other entities of the system 200 using various standard network communication protocols, including, for example, those discussed elsewhere herein.

The display 270 may display electronic images and data output by the computing system 260 for presentation to a user 212. The display 270 may include any conventional display device, monitor or screen, including, for example, an organic light-emitting diode (OLED) display, a liquid crystal display (LCD), etc. In some implementations, the display 270 may be a touch-screen display capable of receiving input from one or more fingers of a user 212. For example, the display 270 may be a capacitive touch-screen display capable of detecting and interpreting multiple points of contact with the display surface. In some implementations, the computing system 260 may include a graphics adapter (not shown) for rendering and outputting the images and data for presentation on display 270. The graphics adapter (not shown) may be a separate processing device including a separate processor and memory (not shown) or may be integrated with the processor 262 and memory 264.

The input device 272 may include any device for inputting information into the computing system 260. In some implementations, the input device 272 may include one or more peripheral devices. For example, the input device 272 may include a keyboard (e.g., a QWERTY keyboard), a pointing device (e.g., a mouse or touchpad), microphone, an image/video capture device (e.g., camera), etc. In some implementations, the input device 272 may include a touch-screen display capable of receiving input from the one or more fingers of the user. For instance, the structure and/or functionality of the input device 272 and the display 270 may be integrated, and a user of the computing system 260 may interact with the computing system 260 by contacting a surface of the display 270 using one or more fingers. In this example, the user could interact with an emulated (i.e., virtual or soft) keyboard displayed on the touch-screen display 270 by using fingers to contact the display in the keyboard regions.

The data store 274 may be included in the computing system 260 or in another computing system and/or storage system distinct from but coupled to or accessible by the computing system 260. The data store 274 can include one or more non-transitory computer-readable mediums for storing the data. In some embodiments, the data store 274 may be incorporated with the memory(ies) 264 or may be distinct therefrom. In some embodiments, the data store 274 may store data associated with a database management system (DBMS) operable on the computing system 260. For example, the DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations. In these or other instances, the DBMS may store data as nodes and edges of graph, key-value pairs, or documents.

Figure 3:
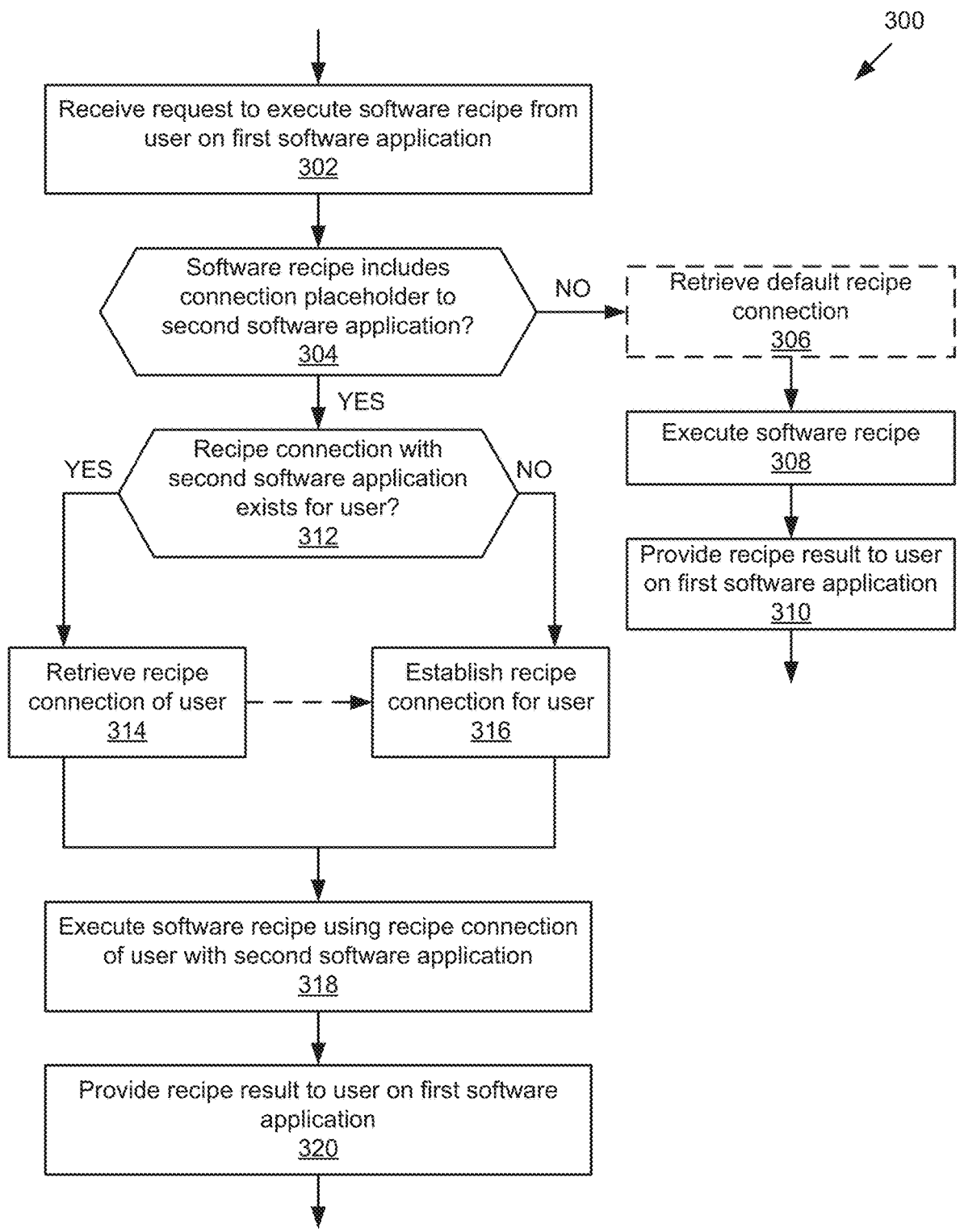
FIG. 3 is a flowchart illustrating an example method for executing a software recipe.

FIG. 3 is a flowchart illustrating an example method 300 for executing a software recipe according to some implementations of the technology described herein.

At 302, the software recipe manager 110 may receive a request to execute a software recipe from a user on a first software application, such as the interface software application 104. In some implementations, the first software application may include a chat application, which may be coupled with a virtual agent. For instance, the chat application may be an interface software application 104 that is coupled with an interaction bot 120, as described in further detail above. In some implementations, the first software application may include some other application (e.g., a client application 208) capable of sending requests to the software recipe manager 110.

In some implementations, receiving the request to execute the software recipe from the first user may include the virtual agent receiving a chat message in a communication channel of a chat application, extracting the request to execute the software recipe from the chat message, and identifying the first user in the chat application from the chat message. The virtual agent may call the software recipe based on the request to execute the software recipe. For example, the virtual agent may receive a chat message including a command or request (e.g., which may be associated with or correspond to a trigger event of a recipe) in a group chat environment and identify the user who submitted the chat message.

It should be noted, that although the technologies described herein may be described in reference to a first user, they may be applicable to multiple users, for example, in a team, group chat, or other collaborative environment, or they may be applicable, depending on the implementation, in a one on one interaction between a user and the software recipe manager 110.

In some implementations, the software recipe manager 110 may determine a type of request, based on the request, particular recipe, type of recipe, or type of task being executed. For instance, a first type of request might be one that any user in a group chat/channel may be allowed to initiate (e.g., if the user is authenticated, as described below), in which circumstance, the connection details used for each user may be unique to and, in some instances, only available and/or known to that user or a set or subset of users to which the user belongs. A second type of request may include one that only a particular user, such as an administrator, can initiate. The software recipe manager 110, in response to the second type of request, may run the software recipe for the requesting user. The software recipe manager 110 may then use the connection details for the user to perform the software recipe. If the user is authorized to perform the operation (e.g., if the user is an administrator, in this example) then the action may be performed, but if the user is not authorized, the action may fail, send an error message, or automatically request administrator credentials or approval by an authorized user.

At 304, the software recipe manager 110 may determine whether the software recipe includes a connection placeholder to a second software application, such as a service software application 108. For instance, the software recipe manager 110 may determine whether the software recipe has associated therewith an existing or a default connection or if, for instance, a connection of the software recipe is tagged as late bindable, that is, that a connection for the software recipe may be determined at runtime or at some other time after the software recipe's creation, as described in further detail elsewhere herein.

At 306, the software recipe manager 110 may, in response to determining that the software recipe does not include a connection placeholder, may retrieve a default recipe connection for the software recipe. For instance, if the software recipe manager 110 determines that the software recipe excludes a connection placeholder for the software recipe connection to a service software application 108, the software recipe manager 110 may retrieve a default recipe connection to the service software application 108 (e.g., from the connection data store 126), use a connection stored in the software recipe, or execute the software recipe without a connection (e.g., if the software recipe does not require a connection to a service software application 108).

At 308, the software recipe manager 110 may execute the software recipe (e.g., using the default recipe connection, if applicable, as described above) and, at 310, may provide a recipe result from the execution of the software recipe to a user via a first application, such as the interface software application 104. For instance, the recipe engine 122 may communicate with a service software application 108 to send a command (e.g., via an API or some other communication protocol) to the service software application 108 and may receive data (e.g., a result of the command) from the service software application 108. The recipe engine 122 may then provide the result to the user, for example, via the interface software application 104. In some implementations, the interaction bot 120 may provide the result to the user via one or more chat messages (or e-mails, text messages, etc.) in an individual or group chat/channel, a link provided in a chat message, or a file attached to a chat message, etc.

At 312, the software recipe manager 110 may, in response to determining that the software recipe includes a connection placeholder, may determine whether a recipe connection to a second application, such as the service software application 108, exists for the user. For instance, the software recipe manager 110 may identify the user (or a client device of the user) sending the request and query the connection data store 126 for connection data based on the software recipe and the user. For instance, the software recipe manager 110 may determine that an action of a recipe is to create a calendar appointment on Google® calendar in which circumstance, the software recipe manager 110 may determine if it has connection details stored for the user's Google™ calendar and, in some instances, if it is authorized to make changes to the user's calendar.

At 314, the software recipe manager 110 may, in response to determining that a recipe connection to the second software application (e.g., a particular service software application 108 called by the request), retrieve a recipe connection of the user, for example, from the connection data store 126. For example, the connection details for the particular user may include an access token associated with the particular user. As described in further detail above, the access token may enable a connection, for a user associated with the token, between a computing device (e.g., the interface software application 104 or recipe engine 122) and another application, such as the service software application 108. For instance, the software recipe manager 110 may receive the access token from the service software application 108 in response to user credentials of the user (and/or a client device of the user) being authenticated by the service software application 108 and, in some instances, the software recipe manager 110 may then use the access token to authenticate future connections, such as for use with software recipes, as described herein.

In some implementations, the software recipe manager 110 may also determine whether the connection details (e.g., a token) expire and/or are expired. In some instances, if connection details have expired, the software recipe manager 110 may automatically renew the connection details, for example, using operations described in reference to 316, 408, and/or 410.

At 316, the software recipe manager 110 may establish a recipe connection for the user using retrieved, received, or determined connection details. In some implementations, the software recipe manager 110 may establish a recipe connection for the user in response to determining that no recipe connection currently exists for the user or that an existing recipe connection is no longer valid (e.g., has expired). For instance, if no connection details for the user are stored in the connection data store 126 or the connection details are no longer valid, the software recipe manager 110 may establish connection details for the user.

In some implementations, the software recipe manager 110 may establish connection details for a connection to the service software application 108 for a particular user including facilitating authentication of the user by the service software application 108. The software recipe manager 110 may receive the connection details of the connection from the service software application 108 and store the connection details of the connection in the connection data store 126 in association with the user. Establishing a recipe connection is described in further detail, for example, in reference to FIG. 4.

In some implementations, actions and/or connections may be attributed to an administrator account, as discussed above, so that a ticket, task, or result of a recipe may be created for the administrator account. Additionally, as described above, an administrator may have a more privileges than other users.

At 318, the software recipe manager 110 may execute the software recipe using the recipe connection of the user with the second software application, such as the service software application 108. For example, the software recipe manager 110 may execute the software recipe using the determined connection details in place of the connection placeholder. Executing the software recipe may include generating a recipe result using the connection of the user to the service software application 108. For instance, the interaction bot 120 may receive a recipe result from the service software application 108 based on the request and provide the recipe result in a communication channel of a chat application to the user.

At 320, the software recipe manager 110 may provide the recipe result to the user on a first software application, such as the interface software application 104.

Figure 4:
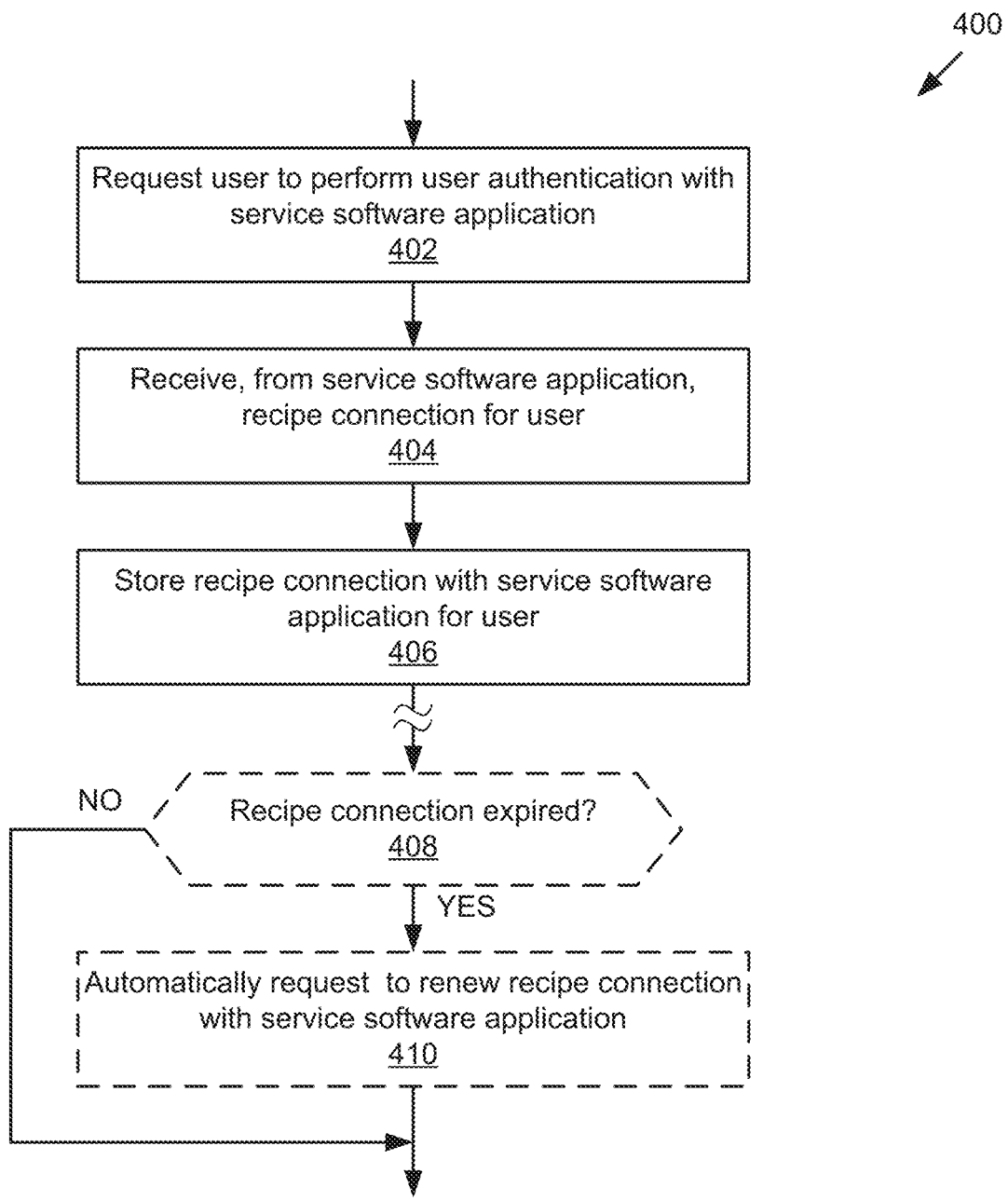
FIG. 4 is a flowchart illustrating an example method for determining a connection for a software recipe.

FIG. 4 is a flowchart illustrating an example method 400 for determining a connection according to some implementations of the technology described herein.

In some implementations, at 402, the software recipe manager 110 may request that a user perform user authentication with the service software application 108 and, at 404, the software recipe manager 110 may receive, from the service software application 108, a recipe connection of the user.

In some implementations, in response to determining that connection does not exist for a particular user for the software application, the software recipe manager 110 may send a message to the user including a link configured to create a connection for the service software application 108. The software recipe manager 110, the interface software application 104, and/or the service software application 108, for example, may receive a selection of the link by the user and, in response, provide a connection credentials interface for receiving connection credentials for display to the user. In some implementations, one or more of the components 104, 108, and 110 may store connection details (e.g., a token) or connection credentials entered by the user in a connection data store 126 and, in some instances, the recipe engine 122 may execute the command using the stored connection.

In some implementations, the interaction bot 120 may send an ephemeral message to a user via group chat channel with a link to provide a connection to the application. When the user selects the link, a connection credentials screen may be displayed and the connection credentials may be stored in the connection data store 126 or transmitted to the service software application 108 for authentication and a token corresponding to the connection credentials may be stored in the connection data store 126.

At 406, the software recipe manager 110 may store the recipe connection with the service software application 108 for the user, for example, in the connection data store 126. In some implementations, the software recipe manager 110 may maintain a connection on behalf of each user. For example, the first time the user interacts with the software recipe manager 110 (e.g., via the interaction bot 120) the software recipe manager 110 may ask the user to authorize the software recipe manager 110 to connect with the service software application 108 on their behalf. The software recipe manager 110 may then store this connection and use it for subsequent interactions.

In some implementations, at 408, the software recipe manager 110 may determine whether a recipe connection expired, for example, at runtime. For example, a recipe connection may include a token, which has an expiration date, in which instances, the software recipe manager 110 may detect that the token has expired request re-authentication by the user and/or automatically renew the token.

In some implementations, at 410, the software recipe manager 110 may automatically request to renew the recipe connection with the service software application 108. For example, the software recipe manager 110 may automatically request, from the service software application 108, the connection details (e.g., the token). In some instances, the software recipe manager 110 may receive, from the service software application 108, new connection details for the connection and may store the new connection details for the connection in the connection data store 126.

Figure 5:
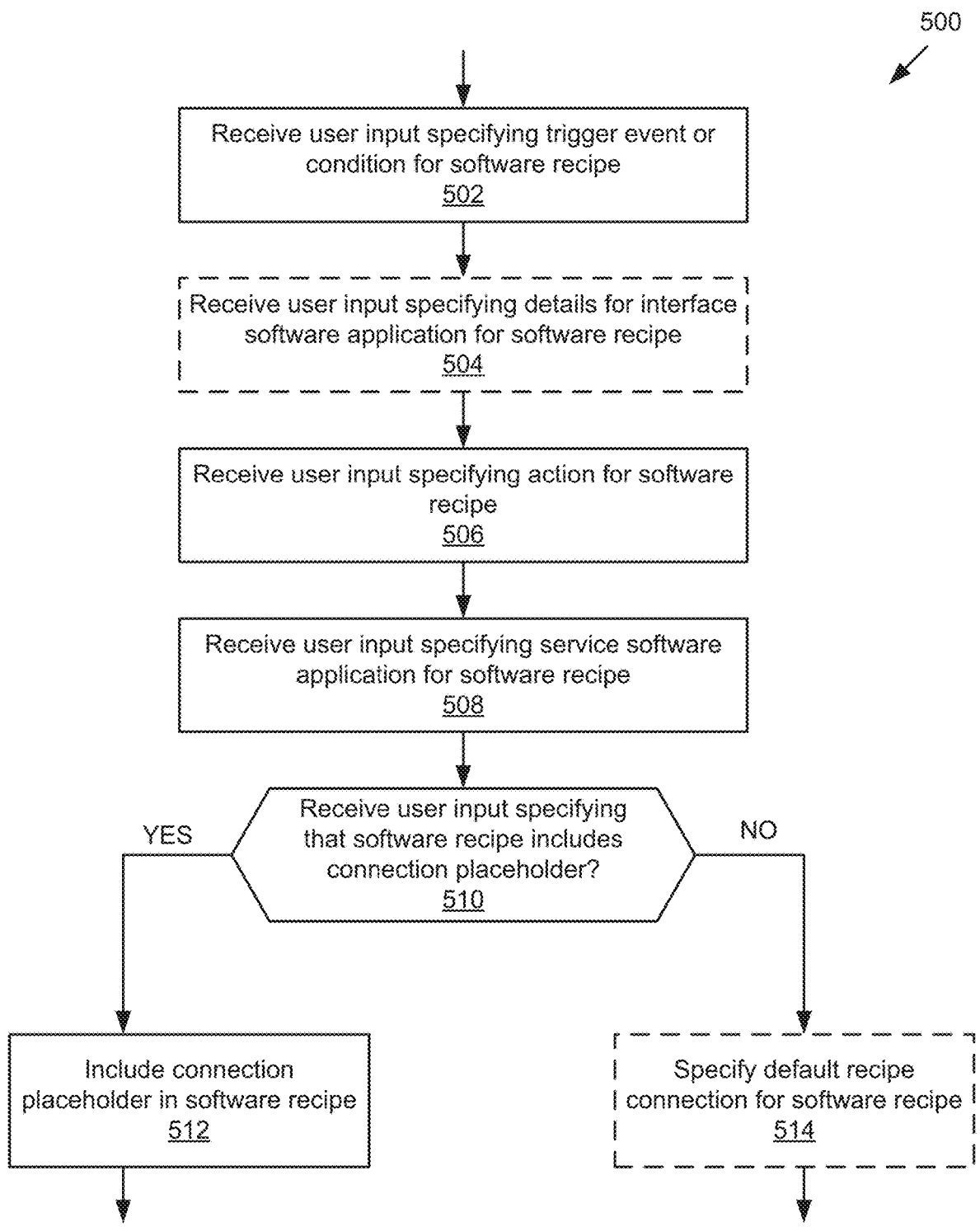
FIG. 5 is a flowchart illustrating an example method for generating a software recipe.

FIG. 5 is a flowchart illustrating an example method 500 for generating the software recipe according to some implementations of the technology described herein. The method 500 may allow a user, such as an administrative user (e.g., a user with an administrative access level for a particular group of users, although other implementations are possible) to define trigger conditions and action responses.

According to some implementations, a recipe with an interaction bot 120 trigger allows a user to tag recipe connections as late bindable. The software recipe manager 110 may then store a state on behalf of users or sets of users to store connections per user. Accordingly, as described above, when a user submits a command associated with a recipe with late bound connections or one or more connection placeholders, the software recipe manager 110 may use the techniques described above to execute the software recipe.

At 502, the software recipe manager 110 may receive user input specifying one or more trigger events or conditions for the software recipe. In some implementations, these trigger events may be associated with or received through an interaction bot 120. In some implementations, a trigger event may include a connection placeholder.

In some implementations, at 504, the software recipe manager 110 may receive user input specifying details for the interface software application 104 for the software recipe. For example, the software recipe may be executable through an interaction bot 120 and the user may provide keywords or identifiers signaling to the interaction bot 120 that a request is addressed to the interaction bot 120 and referencing a particular recipe or trigger event.

At 506, the software recipe manager 110 may receive user input specifying one or more actions for the software recipe, for example, to perform in response to the trigger events/conditions. In some implementations, an action may include communication with a service software application 108 to perform an operation.

At 508, the software recipe manager 110 may receive a user input specifying a service software application 108 for the software recipe. In some implementations, a service software application 108 may use or require a user specific connection, identification, or authentication. For instance, a service software application 108 may use user authentication to an account of the user with the service software application 108, in which instances, the software recipe manager 110 may use connection details as described above.

At 510, the software recipe manager 110 may receive user input tagging a recipe connection as late bindable and/or specifying that the software recipe includes a connection placeholder. In such instances, the connection placeholder may be saved to the software recipe (e.g., as stored in the recipe data store 124), so that when the software recipe is executed, the connection placeholder identifies to the recipe engine 122 that a connection is to be determined for the user for the software recipe, as described in further detail above.

At 512, the software recipe manager 110 may, in response to receiving an input specifying that the software recipe includes a connection placeholder, include a connection placeholder in the software recipe. For instance, responsive to the software recipe being tagged as late bindable, the software recipe manager 110 may store the connection placeholder in association with the one or more of the trigger condition and the action response of the software recipe in the recipe connection data store 126.

At 514, the software recipe manager 110 may, in response to receiving an input specifying that the software recipe does not include a connection placeholder, specify a default recipe connection (e.g., for the service software application 108) for the software recipe. For instance, a software recipe action may not use a service software application 108 or may use the same connection regardless of the user or circumstance in which the software recipe is triggered.

Figure 6A:
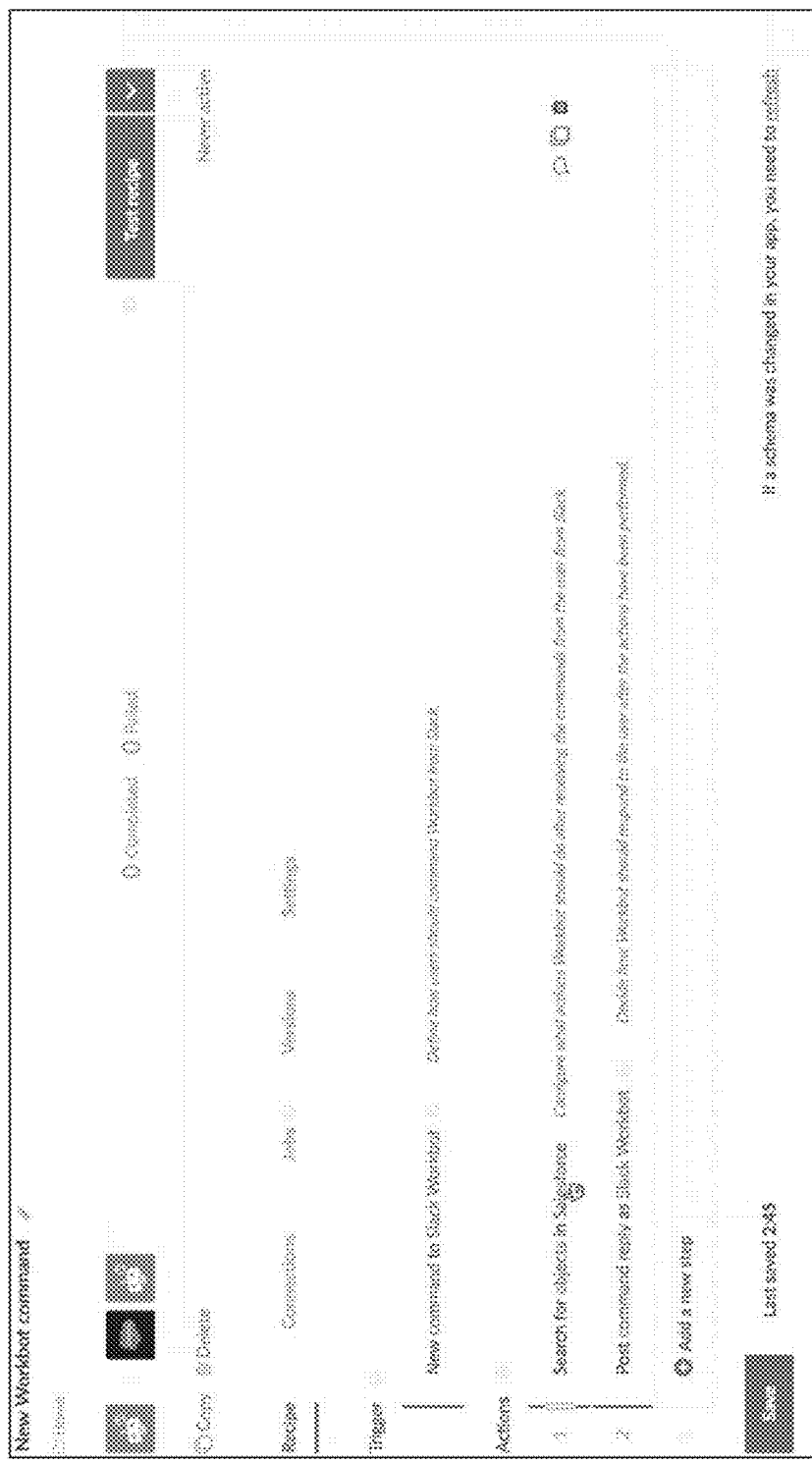
FIGS. 6A through 8E illustrate example graphical user experience interfaces for using software recipes and recipe connections in a chat interface.
Figure 6B:
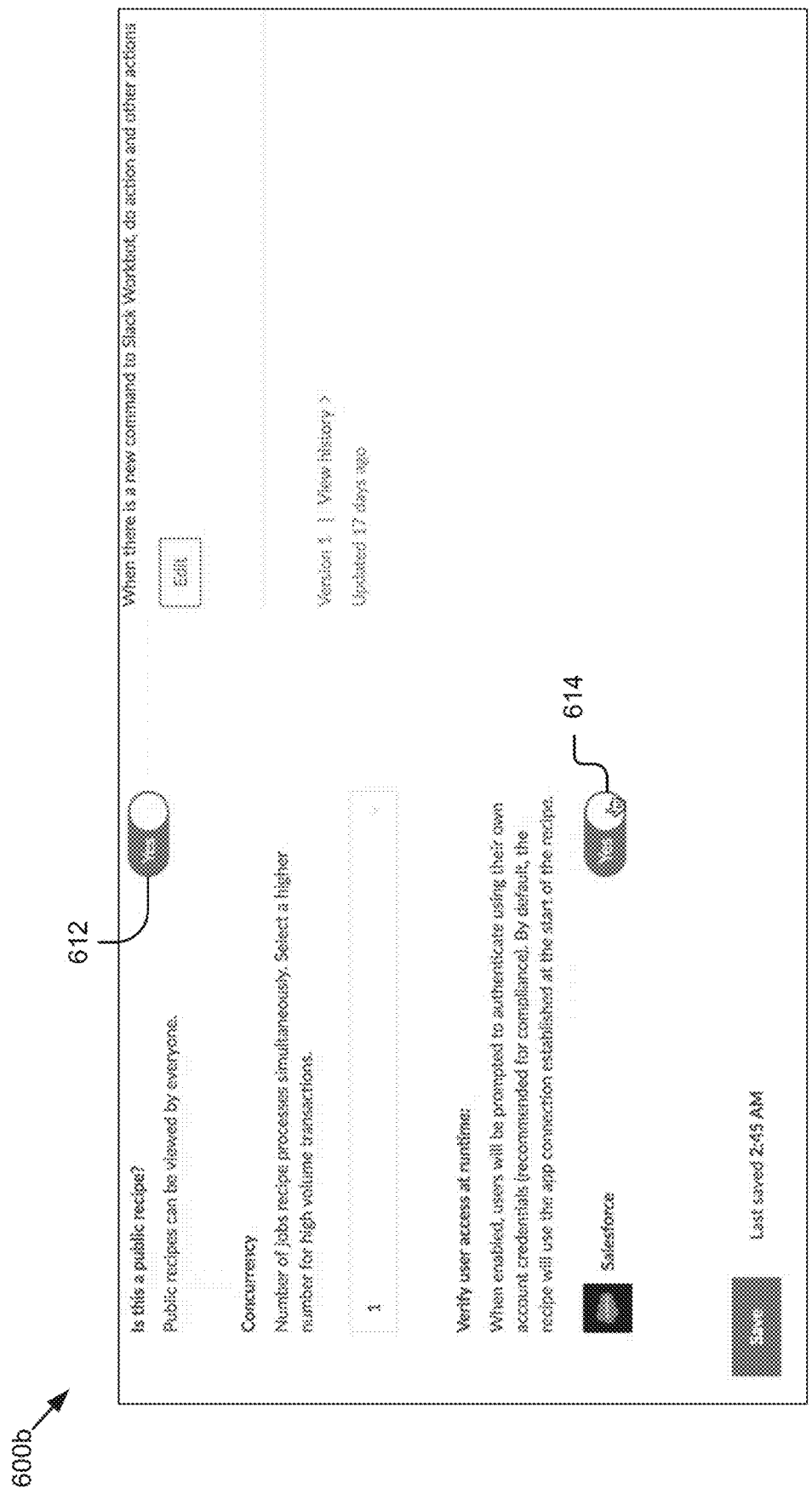
Figure 6C:
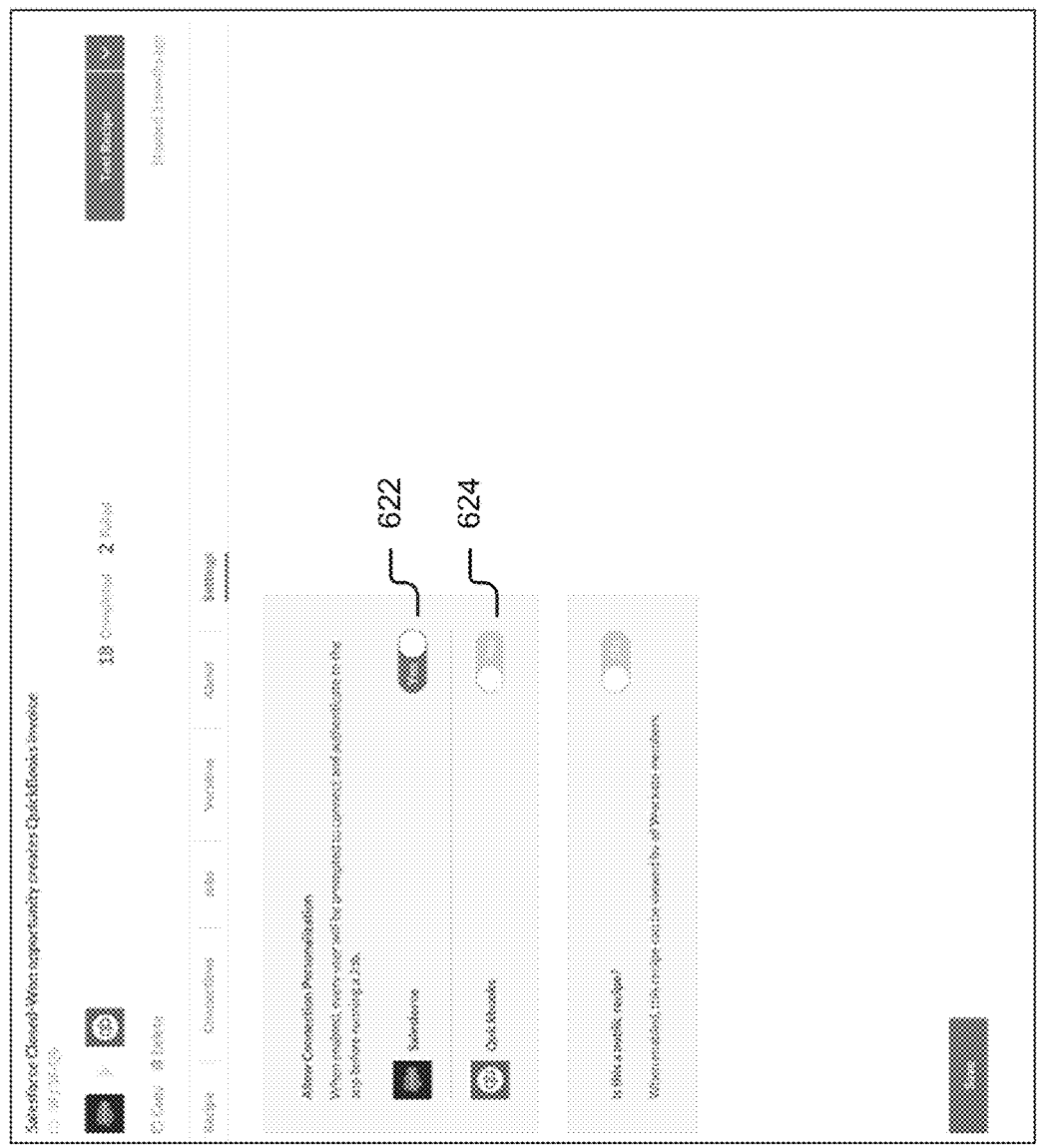

FIGS. 6A through 6C illustrate example graphical user experience interfaces for generating software recipes.

FIG. 6A illustrates an example interface 600*a* for creating a software recipe. For instance, the interface 600*a* includes a graphical region 602 for receiving user input defining trigger events or conditions and a graphical region 604 for receiving user input defining actions.

FIG. 6B illustrates an example interface 600*b* for creating a software recipe. The interface 600*b* may include a graphical element 612 for selecting whether a recipe, or the results thereof, may be viewed or hidden by other users, for example, in a group chat channel/environment. The interface 600*b* may also include a graphical element 614 for selecting whether to make a connection in a recipe late bindable or using a connection placeholder in the software recipe. For instance, as described in further detail above, the software recipe manager 110 may allow a user to cause a connection to a particular service software application 108 to be verified or generated at runtime.

FIG. 6C illustrates an example interface 600*c* for creating a software recipe. The interface 600*c* may include one or more selectable elements 622 and 624 for receiving input from the user to make connections to one or more corresponding service software application 108*s* customizable to users (e.g., using connection placeholders for the recipe connections to those service software application 108*s*, as described above). For instance, a particular recipe may have actions that communicate with a plurality of service software application 108*s*.

Figure 7A:
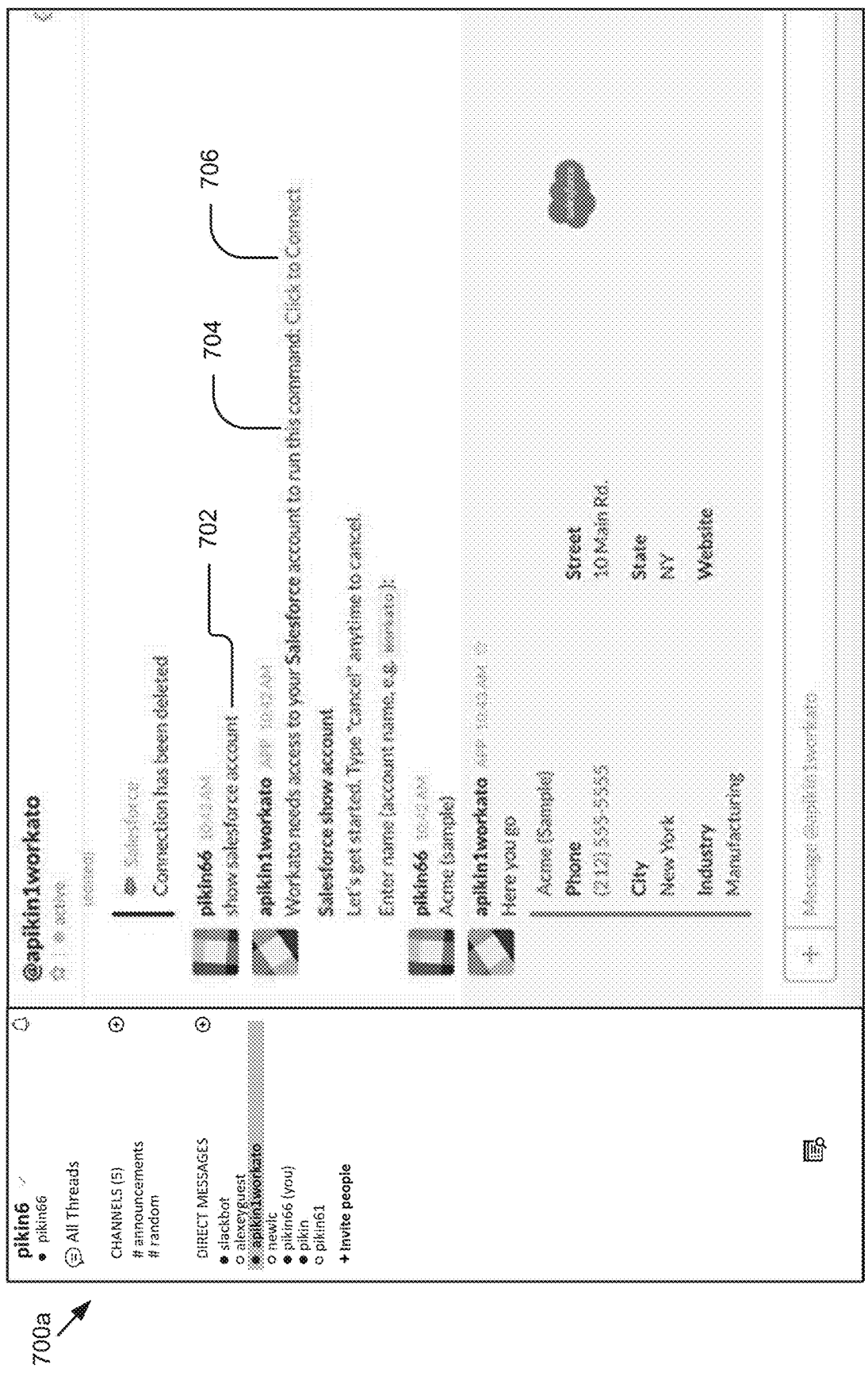

FIG. 7A illustrates an example graphical user experience interface 700*a* for managing connections in a chat interface. In FIG. 7A, a user is interacting with an interaction bot 120 via a chat interface, which may be implemented, for instance, on an interface software application. For instance, the user enters the command/request at 702, which may cause the software recipe manager 110 to determine that a connection is needed to run the command (e.g., a connection placeholder is in the software recipe). The software recipe manager 110 (e.g., via the interaction bot 120) may send a request to the user in a message 704 requesting that the user provide access to the user's account on the service software application 108. In some implementations, the message 704 may include a link 706 that the user can select to create the connection.

Figure 7B:
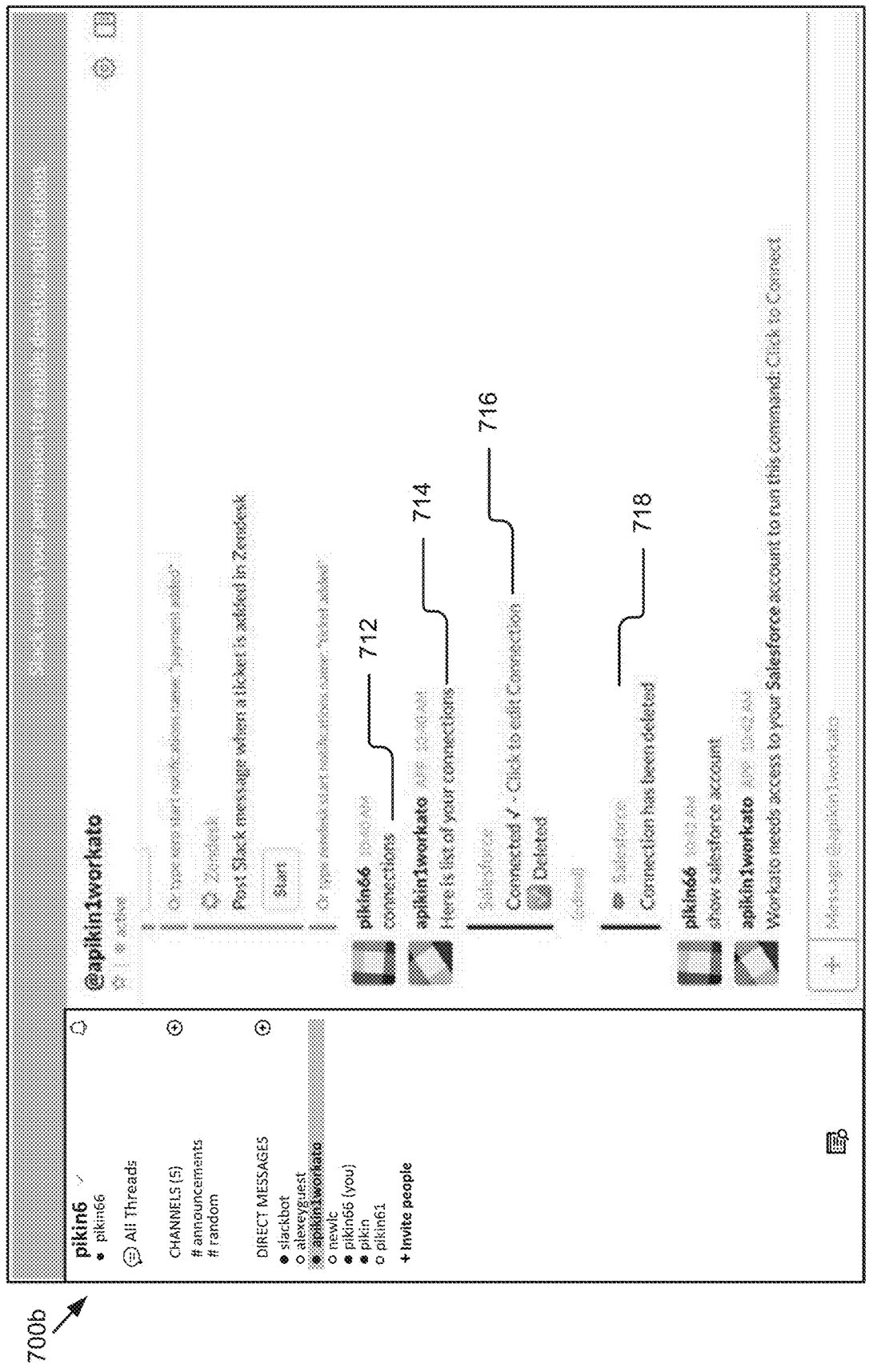

FIG. 7B illustrates an example graphical user experience interface 700*b* for managing connections in a chat interface. In FIG. 7B, a user is illustrated sending a message in a chat interface to an interaction bot 120, which, in some instances, may have been previously addressed by the user thereby alerting the interaction bot 120 to expect a request from the user. The interaction bot 120 may receive a message 712 including a keyword "connections" signaling to the interaction bot 120 that the user wishes to receive a list of connections for that user (e.g., for the interaction bot 120, for a particular recipe, for a list of recipes for which the user has connections, etc.), according to the techniques described herein. The interaction bot 120 may retrieve the connections for the user and may respond by send a message 714 including the list of connections (e.g., by retrieving the connections from the connection data store 126). In some implementations, the message 714 may also include a link or other graphical element 716 with which the user may interact to edit or otherwise manage the connections. In some implementations, the interaction bot 120 may modify the message 714 to indicate, in a graphical element 718, that a particular connection has been modified (e.g., deleted), for example if, the user instructs the interaction bot 120 to modify a connection. Although FIG. 7B illustrates an example where a list of connections are shown and a connection is deleted, the interaction bot 120 may additionally or alternatively perform other connection management operations, such as, listing connections for a specific user or for a group of users, disconnecting a connection, modifying a connection, re-connecting a connection, adding a connection for another user, provisioning a user to use a connection or recipe, or performing other operations.

FIGS. 8A, 8B, 8C, 8D, and 8E illustrate example graphical user experience interfaces 800a, 800b, 800c, 800d, and 800e, respectively, for using software recipes and recipe connections in a chat interface, for instance, provided by an interface software application 104.

Figure 8A:
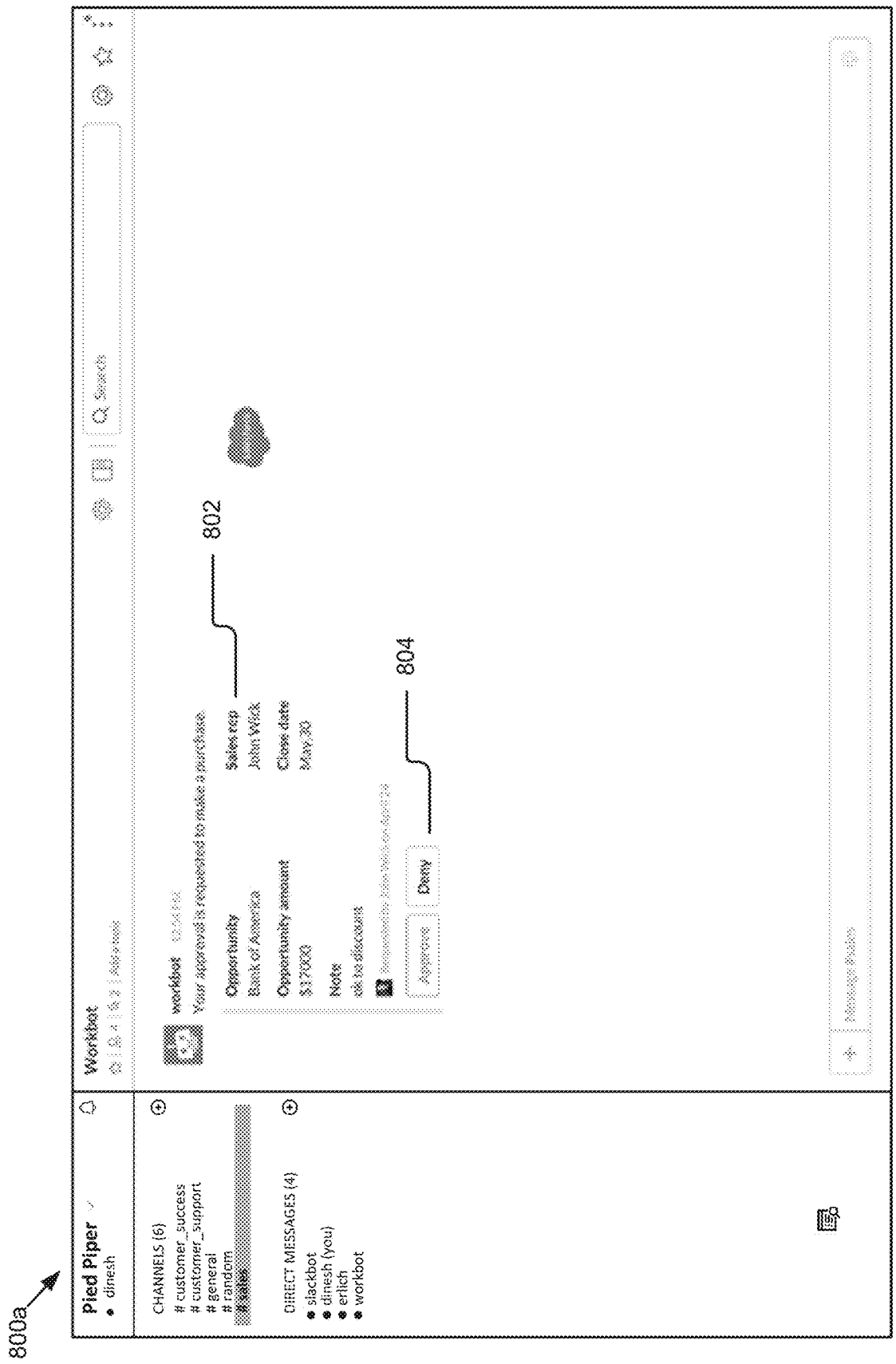

As illustrated in FIG. 8A, the interaction bot 120 may provide a request, such as a request for approval in a chat message 822. For instance, the chat message 822 may include a selectable element 824 that returns a value to the interaction bot 120 and/or service software application 108.

Figure 8B:
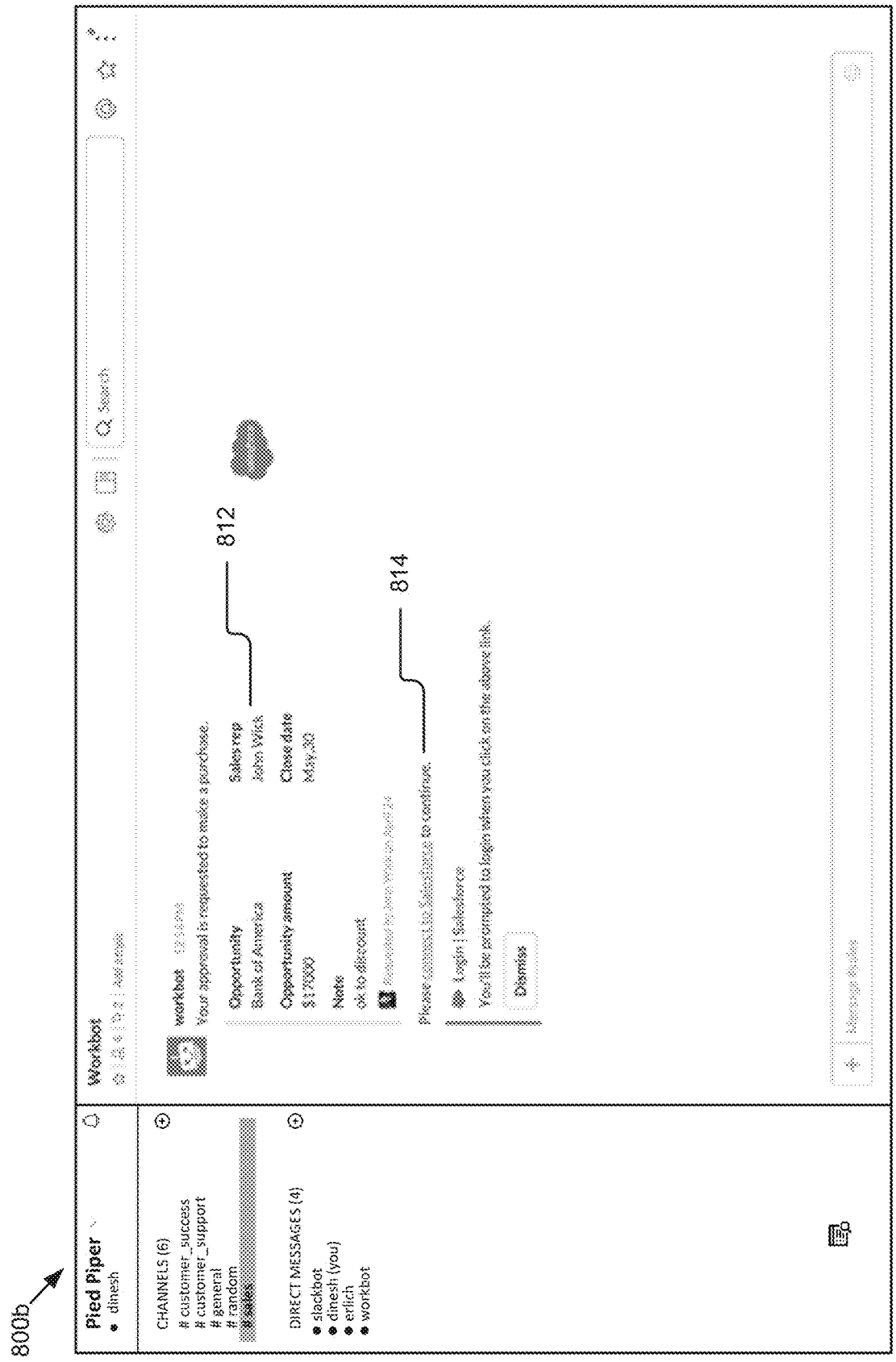

As illustrated in FIG. 8B, an interaction bot 120 may send a message 812 including information provided by an interaction bot 120 and a link 814 to establish a connection with a service software application 108. In some implementations, the action for which the interaction bot 120 is requesting that a connection be established may include an administrator type action for which an administrator level authentication is required (e.g., not any user in a group chat may authorize the action).

Figure 8C:
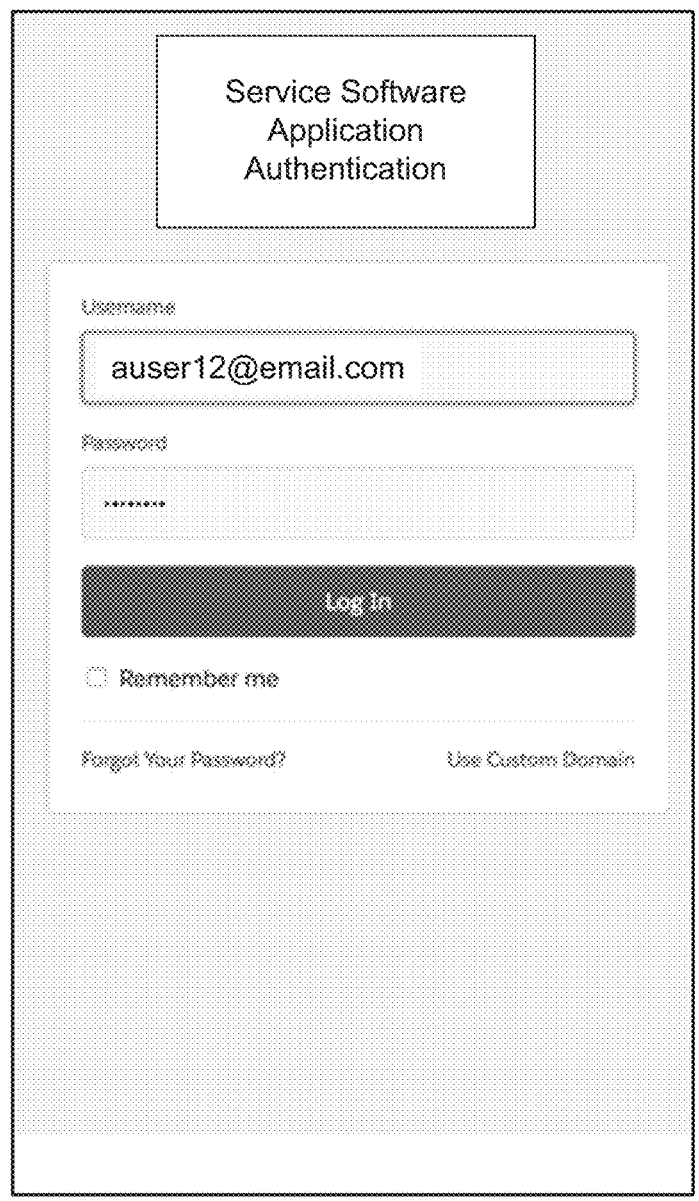

As illustrated in FIG. 8C, a window or overlay 800c may be presented requesting login credentials from the user, for instance, in response to the user selecting the link 814. In some implementations, the window may provide direct communication with the service software application 108, so that the service software application 108 may authenticate the user, as described above.

Figure 8D:
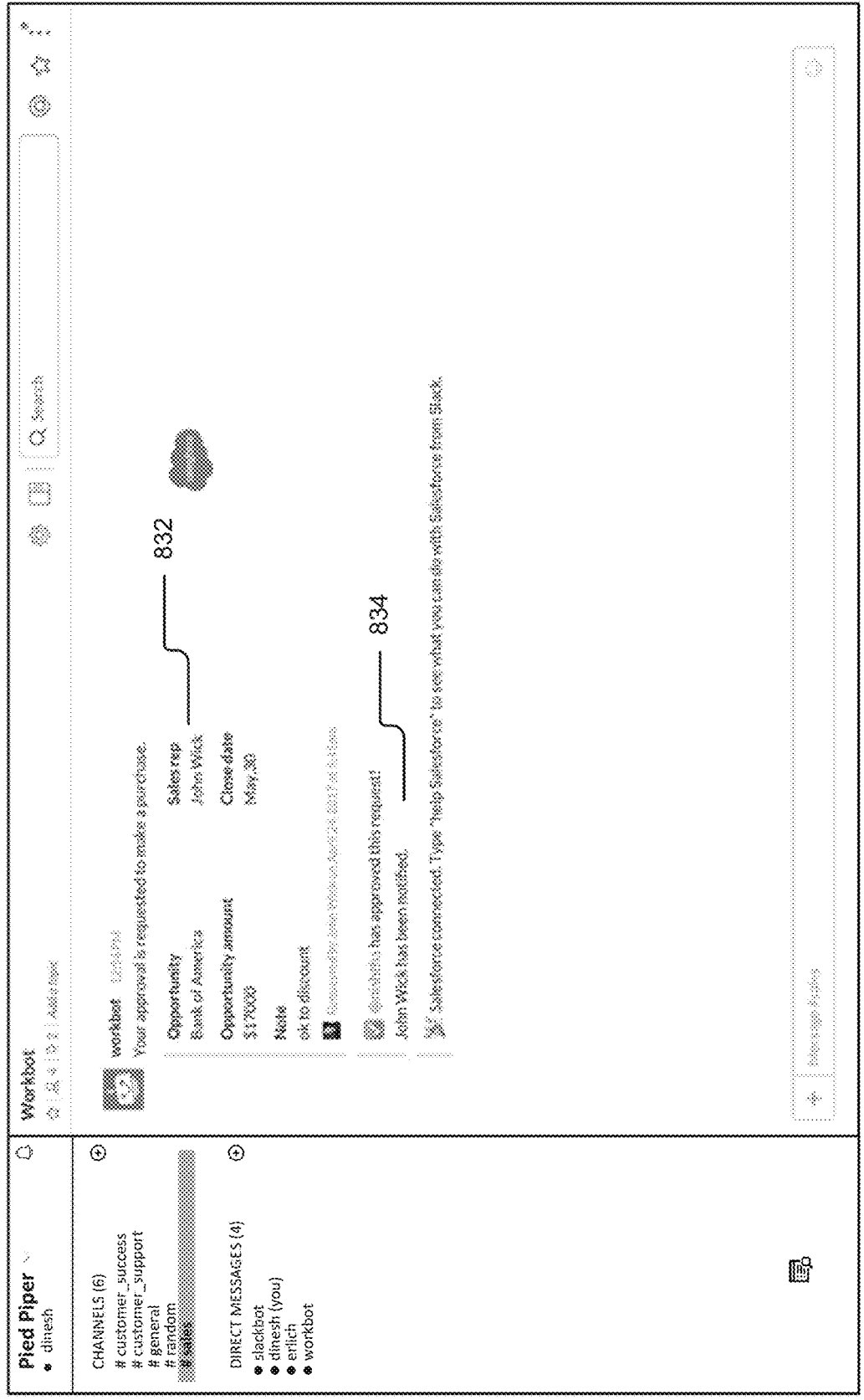

As illustrated in FIG. 8D, in some implementations, the interaction bot 120 may display a graphical element 834 indicating that a particular user (e.g., with an administrator level connection) has selected the selectable element or otherwise performed a given operation. The graphical element 834 may be displayed in a message 832, which may correspond to the message 812 and/or 802 referenced above.

Figure 8E:
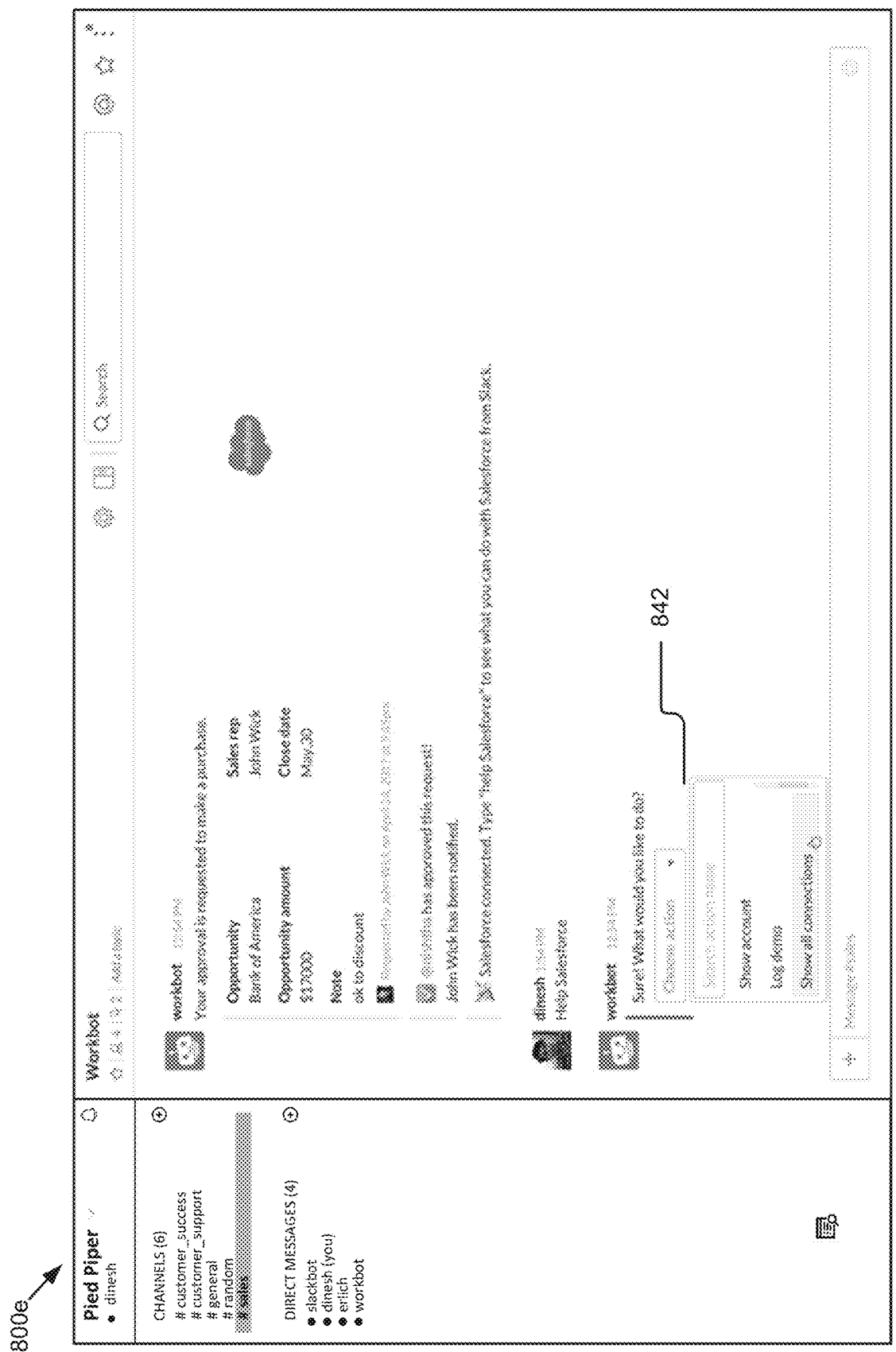

As illustrated in FIG. 8E, the interaction bot 120 may provide other interaction options in a chat interface. For instance, the interaction bot 120 may allow a user to trigger recipes or otherwise interact with a service software application 108, for example, using a graphical element 842, which may include selectable fields, a pull down menu, or another graphical element.

In some implementations, the technology described herein may include a cloud-based service that automates interaction between different applications, such as, web applications, to facilitate data flow. The technology may greatly simplify the logic of connecting different applications allowing the user to build integrations with applications using a drag and drop interface.

While certain acts and/or functionality described herein as being associated with certain modules, it should be understood that these acts and/or functionality may be performed by other modules, or a combination of two or more modules, and/or moved from a client side or server side implementation without departing from the scope of this disclosure. Additionally, it should be understood that the system illustrated herein is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services. Thus, it should be understood that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the described system(s) may be integrated into to a single computing device or system or additional computing devices or systems, etc. In addition, while the system described herein provides an example of an applicable computing architecture, it should be understood that any suitable computing architecture, whether local, distributed, or both, may be utilized in the system 200.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to a computing device and/or other apparatus for performing the operations herein. This computing device may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in executable software, which includes but is not limited to an application, firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Communication unit(s) (e.g., network interfaces, etc.) may also be coupled to the system to enable the data processing system to become coupled to other data processing systems, storage devices, remote printers, etc., through intervening private and/or public networks, such as the network 202.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
    receiving, by an interaction bot, a request to execute a software recipe from a first user via a chat message in a group-chat channel of a first software application including detecting a trigger for the software recipe in the chat message, the group-chat channel allowing communication among multiple users, wherein the request from the first user is received using the interaction bot that parses messages in the group-chat channel to detect the trigger and identifies the first user;
    based on detecting the trigger in the chat message in the group-chat channel, determining the software recipe from among multiple available software recipes, each of the multiple available software recipes including a trigger, an action caused by the trigger, and a connection placeholder defining a connection with one or more separate software applications;
    based on determining that the determined software recipe has a connection placeholder, determining a first connection to a second software application for the first user based on an identity of the first user from which the chat message for the request was received in the group-chat channel and the connection placeholder for the software recipe;

retrieving first connection details of the first connection to the second software application from a recipe connection data store including an access token based on credentials of the first user; and executing the software recipe using the first connection details in place of the connection placeholder for the first connection to the second software application including authenticating the first connection for the first user between a computing device and the second software application using the access token based on the first connection details for the first user.

2. The computer-implemented method of claim 1, further comprising:

determining that the software recipe includes the connection placeholder for a connection to the second software application; and in response to determining that the software recipe includes the connection placeholder, determining that the first connection to the second software application exists for the first user.

3. The computer-implemented method of claim 1, wherein determining the first connection to the second software application is based on the request received from the first user via the group-chat channel.

4. The computer-implemented method of claim 3, wherein determining the first connection to the second software application includes:

determining the identity of the first user in the first software application based on the request to execute the software recipe received from the first user via the group-chat channel, the received request including the chat message from the first user in the group-chat channel.

5. The computer-implemented method of claim 3, wherein determining the first connection to the second software application includes:

determining one or more of a user profile and a password of the first user associated with the second software application.

6. The computer-implemented method of claim 1, wherein:

the method includes:

receiving an initial request to execute an operation of the software recipe from a second user via the group-chat channel;

determining that the second user is not authorized to request the operation of the software recipe with the second software application; and requesting, via the group-chat channel, approval by an authorized user for the operation of the software recipe with the second software application;

the first user is the authorized user; and the request to execute the software recipe from the first user includes the approval.

7. The computer-implemented method of claim 1, wherein:

the software recipe is executed by a software recipe manager communicatively coupled with the first software application and the second software application; and the software recipe manager manages recipe connections for a plurality of users associated with the group-chat channel and the software recipe, the recipe connections for the plurality of users including the first connection of the first user.

8. The computer-implemented method of claim 1, wherein:

the request from the first user is received using the interaction bot that scans the messages in the group-chat channel, detects one or more triggers of the software recipe in the messages in the group-chat channel, and identifies the first user based on the messages in which the one or more triggers are detected.

9. The computer-implemented method of claim 1, further comprising:

receiving, by a virtual agent, the chat message in the group-chat channel of the first software application;

extracting, by the virtual agent, the request to execute the software recipe from the chat message;

calling, by the virtual agent, the software recipe based on the request to execute the software recipe;

receiving, by the virtual agent, a recipe result from the second software application based on the request to execute the software recipe; and providing, by the virtual agent, the recipe result from the second software application for display to the first user on the group-chat channel of the second software application.

10. The computer-implemented method of claim 1, wherein:

the first connection details include the access token associated with the first user;

the access token enables the first connection for the first user between the software recipe and the second software application; and the first connection is authenticated using the access token.

11. The computer-implemented method of claim 1, further comprising:

receiving user input from a third user identifying a trigger condition and an action response for the software recipe, one or more of the trigger condition and the action response using the first connection to the second software application, the third user having an administrative access level;

receiving user input from the third user tagging a recipe connection to the second software application for the software recipe as late bindable; and responsive to the software recipe being tagged as late bindable, storing the connection placeholder in association with the one or more of the trigger condition and the action response of the software recipe in the recipe connection data store.

12. The computer-implemented method of claim 1, further comprising:

facilitating authentication of the first user by the second software application;

receiving, from the second software application, the first connection details of the first connection to the second software application; and storing the first connection details of the first connection to the second software application in the recipe connection data store in association with the first user.

13. The computer-implemented method of claim 1, wherein executing the software recipe includes:

generating a recipe result using the first connection of the first user to the second software application, and providing the recipe result of the software recipe to the first user on the first software application, the first software application being distinct from the second software application.

14. A system comprising:
one or more processors; and
a non-transitory memory storing instructions that, when executed by the one or more processors, cause the system to:
    receive, by an interaction bot, a request to execute a software recipe from a first user via a chat message in a group-chat channel of a first software application including detecting a trigger for the software recipe in the chat message, the group-chat channel allowing communication among multiple users, wherein the request from the first user is received using the interaction bot that parses messages in the group-chat channel to detect the trigger and identifies the first user;
    based on detecting the trigger in the chat message in the group-chat channel, determine the software recipe from among multiple available software recipes, each of the multiple available software recipes including a trigger, an action caused by the trigger, and a connection placeholder defining a connection with one or more separate software applications;
    based on determining that the determined software recipe has a connection placeholder, determine a first connection to a second software application for the first user based on an identity of the first user from which the chat message for the request was received in the group-chat channel and the connection placeholder for the software recipe;
    retrieve first connection details of the first connection to the second software application from a recipe connection data store including an access token based on credentials of the first user; and
    execute the software recipe using the first connection details in place of the connection placeholder for the first connection to the second software application including authenticating the first connection for the first user between a computing device and the second software application using the access token based on the first connection details for the first user.

15. The system of claim 14, wherein determining the first connection to the second software application is based on the request received from the first user via the group-chat channel.

16. The system of claim 14, wherein:
determining that the software recipe includes the connection placeholder for a connection to the second software application; and
in response to determining that the software recipe includes the connection placeholder, determining that the first connection to the second software application exists for the first user.

17. The system of claim 14, wherein the instructions further cause the system to:
receive an initial request to execute an operation of the software recipe from a second user via the group-chat channel;
determine that the second user is not authorized to request the operation of the software recipe with the second software application; and
request, via the group-chat channel, approval by an authorized user for the operation of the software recipe with the second software application, the first user being the authorized user, wherein the request to execute the software recipe from the first user includes the approval.

18. The system of claim 14, wherein:
the software recipe is executed by a software recipe manager communicatively coupled with the first software application and the second software application; and
the software recipe manager manages recipe connections for a plurality of users associated with the group-chat channel and the software recipe, the recipe connections for the plurality of users including the first connection of the first user.

19. The system of claim 14, wherein:
the request from the first user is received via the interaction bot that scans the messages in the group-chat channel, detects one or more triggers of the software recipe in the messages in the group-chat channel, and identifies the first user based on the messages in which the one or more triggers are detected.

20. A computer-implemented method comprising:
receiving, by an interaction bot, a request to execute a software recipe from a first user via a chat message in a group-chat channel of a first software application including detecting a trigger for the software recipe in the chat message, wherein the request from the first user is received using the interaction bot that parses messages in the group-chat channel to detect the trigger and identifies the first user;
based on detecting the trigger in the chat message in the group-chat channel, determining the software recipe from among multiple available software recipes, each of the multiple available software recipes including a trigger, an action caused by the trigger, and a connection placeholder defining a connection with one or more separate software applications;
determining that the software recipe includes a connection placeholder for a recipe connection to a second software application;
based on determining that the determined software recipe has the connection placeholder, determining that a first connection to the second software application exists for the first user from which the chat message for the request was received in the group-chat channel;
retrieving first connection details of the first connection to the second software application from a recipe connection data store including an access token based on credentials of the first user; and
executing the software recipe using the first connection details in place of the connection placeholder for the recipe connection to the second software application including authenticating the first connection for the first user between a computing device and the second software application using the access token based on the first connection details for the first user.

* * * * *